United States Patent
Kediya et al.

(10) Patent No.: US 12,455,611 B2
(45) Date of Patent: Oct. 28, 2025

(54) POWER OPTIMIZATION FOR CAMERA DEVICES

(71) Applicant: QUALCOMM Incorporated, San Diego, CA (US)

(72) Inventors: Alok Kediya, Hyderabad (IN); Manish Poddar, Burhanpur (IN); Suresh Vankadara, Hyderabad (IN); Mukund Mittal, Hyderabad (IN); Gaurav Gagrani, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 88 days.

(21) Appl. No.: 18/349,082

(22) Filed: Jul. 7, 2023

(65) Prior Publication Data

US 2025/0013285 A1   Jan. 9, 2025

(51) Int. Cl.
| G06F 1/3287 | (2019.01) |
| G06F 1/08 | (2006.01) |
| G06F 1/3234 | (2019.01) |
| G06F 1/3237 | (2019.01) |
| G06F 1/324 | (2019.01) |

(52) U.S. Cl.
CPC .......... *G06F 1/3287* (2013.01); *G06F 1/3237* (2013.01); *G06F 1/324* (2013.01); *G06F 1/08* (2013.01); *G06F 1/3234* (2013.01)

(58) Field of Classification Search
CPC ...... G06F 1/324; G06F 1/3287; G06F 1/3237; G06F 1/3234; G06F 1/08
USPC ......................................... 713/323, 322, 300
See application file for complete search history.

(56) References Cited

U.S. PATENT DOCUMENTS

| 7,797,561 B1 | 9/2010 | Abdalla et al. |
| 8,959,382 B2 | 2/2015 | Vogel |
| 10,838,462 B1* | 11/2020 | Monaco .................. G06F 1/324 |
| 2012/0317430 A1* | 12/2012 | Rahman ............... A61B 5/7455 713/323 |
| 2013/0055004 A1 | 2/2013 | Koniaris et al. |
| 2013/0073889 A1* | 3/2013 | Rauschmayer ....... G06F 1/3287 713/300 |
| 2014/0136867 A1* | 5/2014 | Yamamoto .............. G01P 15/14 713/320 |
| 2016/0370838 A1* | 12/2016 | Gu .......................... G06F 1/324 |
| 2017/0108916 A1* | 4/2017 | Huang .................. G06F 1/3206 |

(Continued)

OTHER PUBLICATIONS

International Search Report and Written Opinion—PCT/US2024/030239—ISA/EPO—Oct. 2, 2024.

*Primary Examiner* — Ji H Bae
(74) *Attorney, Agent, or Firm* — Prcopio, COry, Hargreaves & Savitch LLP

(57) ABSTRACT

Aspects presented herein relate to methods and devices for data processing including an apparatus, e.g., a CPU. The apparatus may obtain an indication of a set of sensors that are connected to at least one clock source at a device. The apparatus may also detect whether each of the set of sensors is an active sensor or an inactive sensor. Further, the apparatus may select a clock configuration for a set of hardware components at the device based on the detection of whether each of the set of sensors is the active sensor or the inactive sensor, where the clock configuration is associated with the at least one clock source. The apparatus may also output an indication of the selected clock configuration for the set of hardware components at the device.

28 Claims, 11 Drawing Sheets

(56) References Cited

U.S. PATENT DOCUMENTS

2020/0073465 A1* 3/2020 Nikhara ................. G06F 1/324
2021/0089074 A1  3/2021 Song et al.
2021/0109585 A1* 4/2021 Fleming ............. G10L 15/1815
2024/0160269 A1* 5/2024 Jha ....................... G06F 1/3206

* cited by examiner

POWER OPTIMIZATION FOR CAMERA DEVICES

TECHNICAL FIELD

The present disclosure relates generally to processing systems and, more particularly, to one or more techniques for graphics and data processing.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor is configured to convert digital information received from a CPU to analog values and may issue commands to a display panel for displaying the visual content. A device that provides content for visual presentation on a display may utilize a GPU and/or a display processor.

A GPU of a device may be configured to perform the processes in a graphics processing pipeline. Further, a display processor or display processing unit (DPU) may be configured to perform the processes of display processing. However, with the advent of wireless communication and smaller, handheld devices, there has developed an increased need for improved graphics or data processing.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a central processing unit (CPU), a display processing unit (DPU), a graphics processing unit (GPU), or any apparatus that may perform display processing. The apparatus may obtain an indication of a set of sensors that are connected to at least one clock source at a device. The apparatus may also detect whether each of the set of sensors is an active sensor or an inactive sensor. Additionally, the apparatus may write, if a certain sensor in the set of sensors is the inactive sensor, an indication to not provide a clock for the at least one clock source. The apparatus may also select a clock configuration for a set of hardware components at the device based on the detection of whether each of the set of sensors is the active sensor or the inactive sensor, where the clock configuration is associated with the at least one clock source. Moreover, the apparatus may receive an indication of a clock for each of the set of hardware components prior to setting the clock control for each of the set of hardware components, where the clock is associated with the at least one clock source. The apparatus may also set a clock control for each of the set of hardware components based on the selected clock configuration, where the clock control is associated with the at least one clock source. The apparatus may also transmit an indication of the at least one clock source for each of the set of hardware components subsequent to setting the clock control for each of the set of hardware components. Further, the apparatus may output an indication of the selected clock configuration for the set of hardware components at the device.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
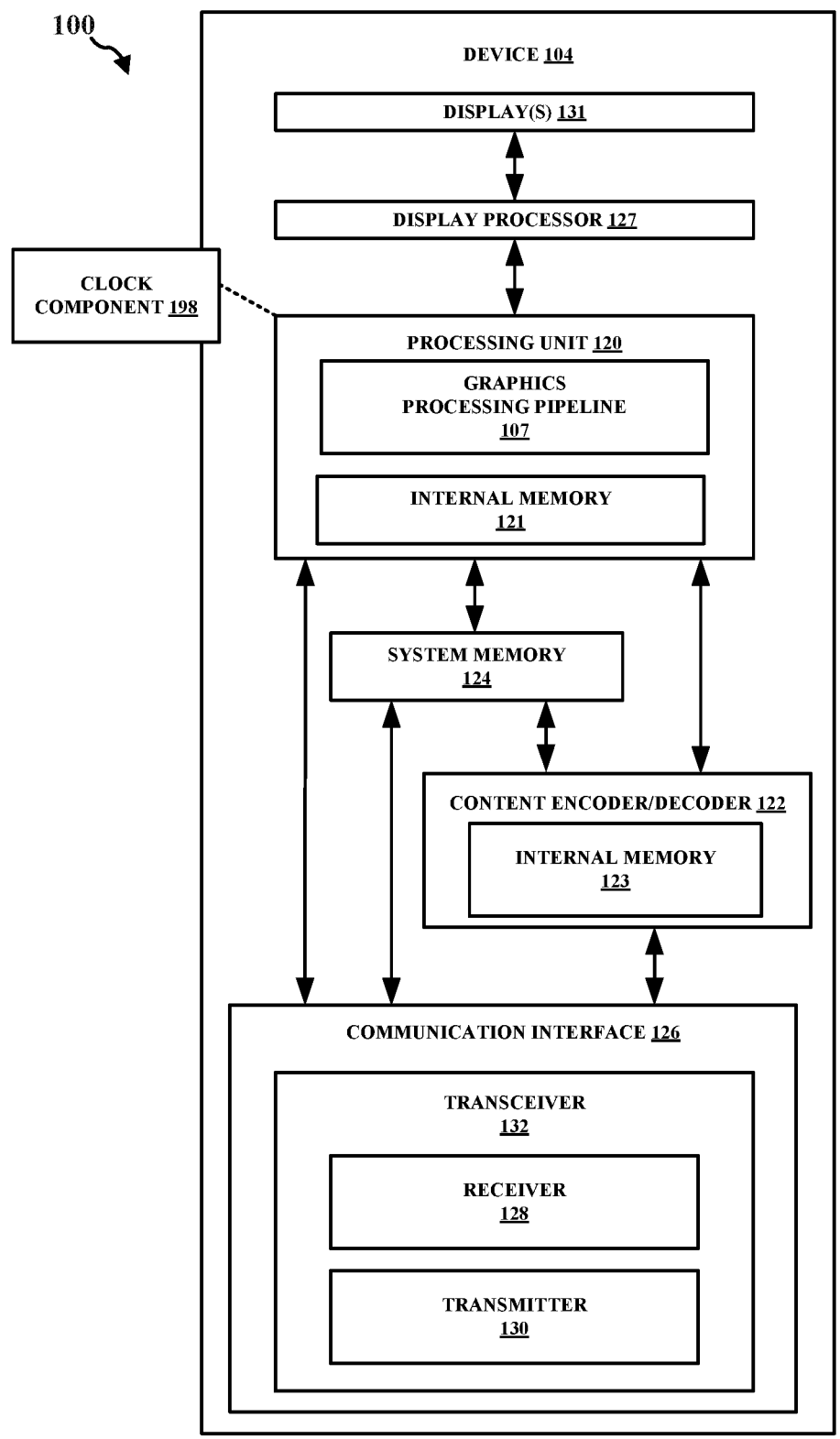
FIG. 1 is a block diagram that illustrates an example content generation system.

One concern for extended reality (XR), augmented reality (AR), and/or mixed reality (MR) devices is power leakage, as many components (e.g., components in a camera pipeline) are connected and running concurrently, which consumes power continuously. However, algorithms running on the XR/AR/MR device may not utilize all of the camera data to be processed. Also, the algorithms may work on a lower configuration (e.g., a lower resolution or frames-per-second (FPS)) in order to generate the necessary details. For example, an XR/AR/MR device may just need head tracking camera information and may not need any of the hand/face/eyebrow/mouth tracking camera information. Also, some cameras may run on a lower resolution and a lower FPS, as the camera may not need a higher configuration for the algorithm to process. Further, the algorithm may skip alternate frames based on the frame data in order to save power. Many conditions may arise where just few cameras (e.g., monochrome cameras) may be needed at a device including different FPS/resolution configurations. However, a common clock control may be utilized for all hardware blocks in the hardware clock architecture. For instance, all hardware blocks in the hardware clock architecture may be connected to the same clock source. Accordingly, the common clock control or common clock source for a number of different hardware components (many of which are not being utilized) may result in an unnecessary amount of power leakage for these components. For instance, the power leakage for each hardware component may be multiplied by the number of sensors. That is, with a high number of sensors, the power leakage for each hardware component may increase substantially. Further, current clock gating or controlling individual hardware components may not be present on devices where all device cameras are connected (e.g., depth cameras or monochrome cameras). Based on the above, it may be beneficial to reduce the amount of power leakage for hardware components in devices (e.g., XR/AR/MR devices). Also, it may be beneficial to utilize individual clock control for individual hardware components in devices (e.g., XR/AR/MR devices). Aspects of the present disclosure may reduce the amount of power leakage for hardware components in certain devices (e.g., camera devices and/or XR/AR/MR devices). For instance, aspects presented herein may utilize individual clock control or individual clock sources for individual hardware components in devices.

Aspects presented herein may include a number of benefits or advantages. For instance, in order to minimize power leakage and/or the idle power at hardware components, aspects presented herein may reduce the FPS/resolution of active hardware blocks/components, so the overall clock/idle power consumption may be reduced. Moreover, aspects presented herein may allow for each hardware block in a system to be clock gated and controlled, so that the hardware blocks can be clock gated/switched off when not in use. Aspects presented herein may reduce the amount of power leakage and/or idle power for hardware components in certain devices (e.g., camera devices and/or XR/AR/MR devices). To reduce the amount of power leakage and/or idle power at each component, aspects presented herein may utilize individual clock control or individual clock sources for individual hardware components in devices. Moreover, aspects presented herein may utilize a dedicated clock control for each hardware component in devices (e.g., camera devices and/or XR/AR/MR devices). Additionally, aspects presented herein may utilize hardware clock gating and individual clock control on each hardware block in devices (e.g., camera devices and/or XR/AR/MR devices). Also, aspects presented herein may activate some hardware components, while other hardware components are clock-controlled and/or clock-gated. For example, aspects presented herein may utilize certain camera clocks that are active while other cameras clocks are clock-controlled and/or clock-gated. Moreover, by utilizing clock gating, each hardware component may receive voltage but no clock, so the amount of power leakage and/or idle power at each hardware component may be reduced substantially.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a content encoder/decoder 122, and a system memory 124. In some aspects, the device 104 may include a number of components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include a communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the display processor 127 may include a clock component 198 configured to obtain an indication of a set of sensors that are connected to at least one clock source at a device. The clock component 198 may also be configured to detect whether each of the set of sensors is an active sensor or an inactive sensor. The clock component 198 may also be configured to write, if a certain sensor in the set of sensors is the inactive sensor, an indication to not provide a clock for the at least one clock source. The clock component 198 may also be configured to select a clock configuration for a set of hardware components at the device based on the detection of whether each of the set of sensors is the active sensor or the inactive sensor, where the clock configuration is associated with the at least one clock source. The clock component 198 may also be configured to receive an indication of a clock for each of the set of hardware components prior to setting the clock control for each of the set of hardware components, where the clock is associated with the at least one clock source. The clock component 198 may also be configured to set a clock control for each of the set of hardware components based on the selected clock configuration, where the clock control is associated with the at least one clock source. The clock component 198 may also be configured to transmit an indication of the at least one clock source for each of the set of hardware components subsequent to setting the clock control for each of the set of hardware components. The clock component 198 may also be configured to output an indication of the selected clock configuration for the set of hardware components at the device. Although the following description may be focused on data processing, the concepts described herein may be applicable to other similar processing techniques.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, may be performed using other components (e.g., a CPU), consistent with disclosed embodiments.

GPUs may process multiple types of data or data packets in a GPU pipeline. For instance, in some aspects, a GPU may process two types of data or data packets, e.g., context register packets and draw call data. A context register packet may be a set of global state information, e.g., information regarding a global register, shading program, or constant data, which may regulate how a graphics context will be processed. For example, context register packets may include information regarding a color format. In some aspects of context register packets, there may be a bit that indicates which workload belongs to a context register. Also, there may be multiple functions or programming running at the same time and/or in parallel. For example, functions or programming may describe a certain operation, e.g., the color mode or color format. Accordingly, a context register may define multiple states of a GPU.

Context states may be utilized to determine how an individual processing unit functions, e.g., a vertex fetcher (VFD), a vertex shader (VS), a shader processor, or a geometry processor, and/or in what mode the processing unit functions. In order to do so, GPUs may use context registers and programming data. In some aspects, a GPU may generate a workload, e.g., a vertex or pixel workload, in the pipeline based on the context register definition of a mode or state. Certain processing units, e.g., a VFD, may use these states to determine certain functions, e.g., how a vertex is assembled. As these modes or states may change, GPUs may need to change the corresponding context. Additionally, the workload that corresponds to the mode or state may follow the changing mode or state.

Figure 2:
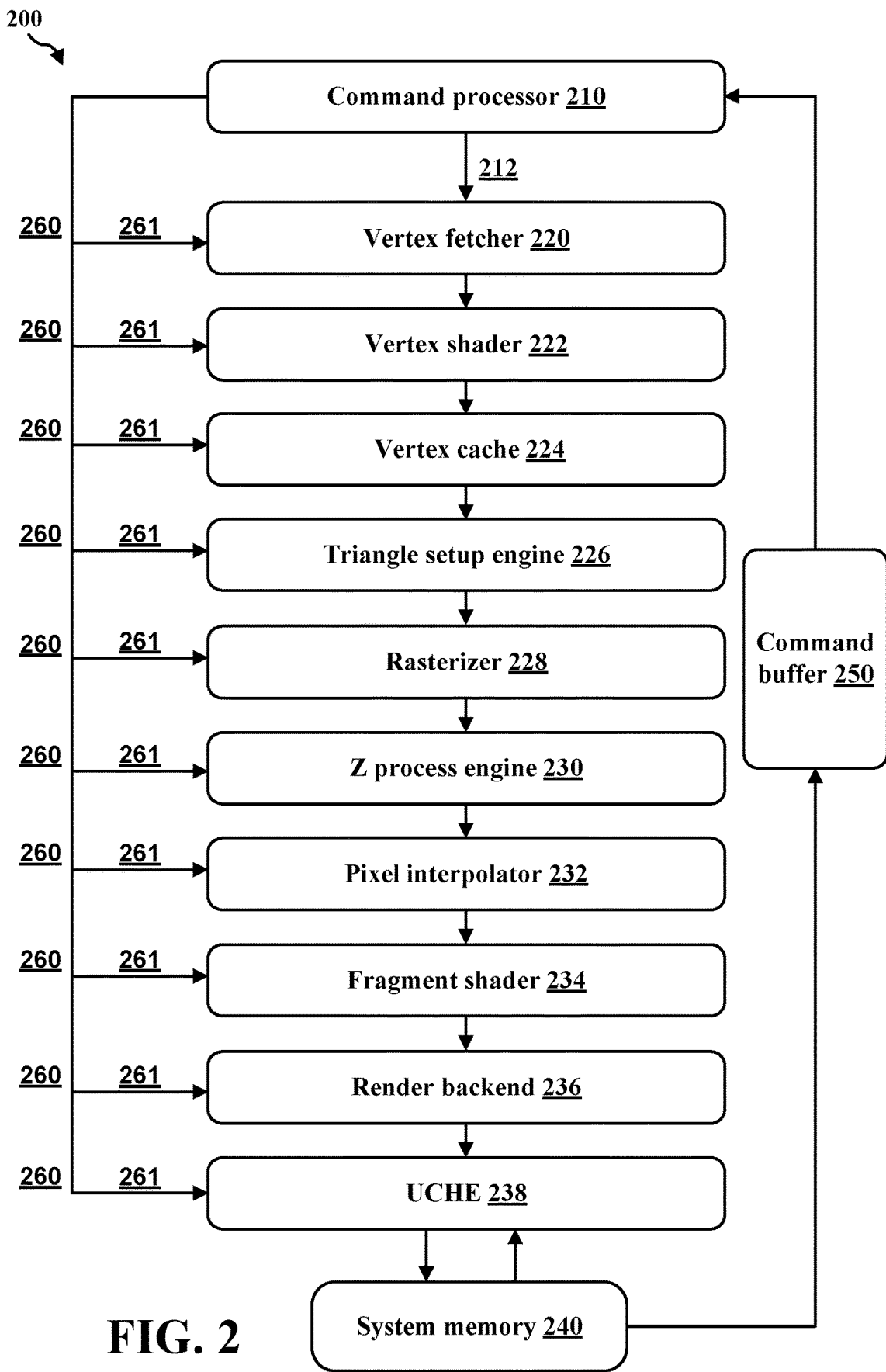
FIG. 2 illustrates an example graphics processing unit (GPU).

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, level 2 (L2) cache (UCHE) 238, and system memory 240. Although FIG. 2 displays that GPU 200 includes processing units 220-238, GPU 200 may include a number of additional processing units. Additionally, processing units 220-238 are merely an example and any combination or order of processing units may be used by GPUs according to the present disclosure. GPU 200 also includes command buffer 250, context register packets 260, and context states 261.

As shown in FIG. 2, a GPU may utilize a CP, e.g., CP 210, or hardware accelerator to parse a command buffer into context register packets, e.g., context register packets 260, and/or draw call data packets, e.g., draw call packets 212. The CP 210 may then send the context register packets 260 or draw call packets 212 through separate paths to the processing units or blocks in the GPU. Further, the command buffer 250 may alternate different states of context registers and draw calls. For example, a command buffer may be structured in the following manner: context register of context N, draw call(s) of context N, context register of context N+1, and draw call(s) of context N+1.

GPUs may render images in a variety of different ways. In some instances, GPUs may render an image using rendering and/or tiled rendering. In tiled rendering GPUs, an image may be divided or separated into different sections or tiles. After the division of the image, each section or tile may be rendered separately. Tiled rendering GPUs may divide computer graphics images into a grid format, such that each portion of the grid, i.e., a tile, is separately rendered. In some aspects, during a binning pass, an image may be divided into different bins or tiles. In some aspects, during the binning pass, a visibility stream may be constructed where visible primitives or draw calls may be identified. In contrast to tiled rendering, direct rendering does not divide the frame into smaller bins or tiles. Rather, in direct rendering, the entire frame is rendered at a single time. Additionally, some types of GPUs may allow for both tiled rendering and direct rendering.

Figure 3:
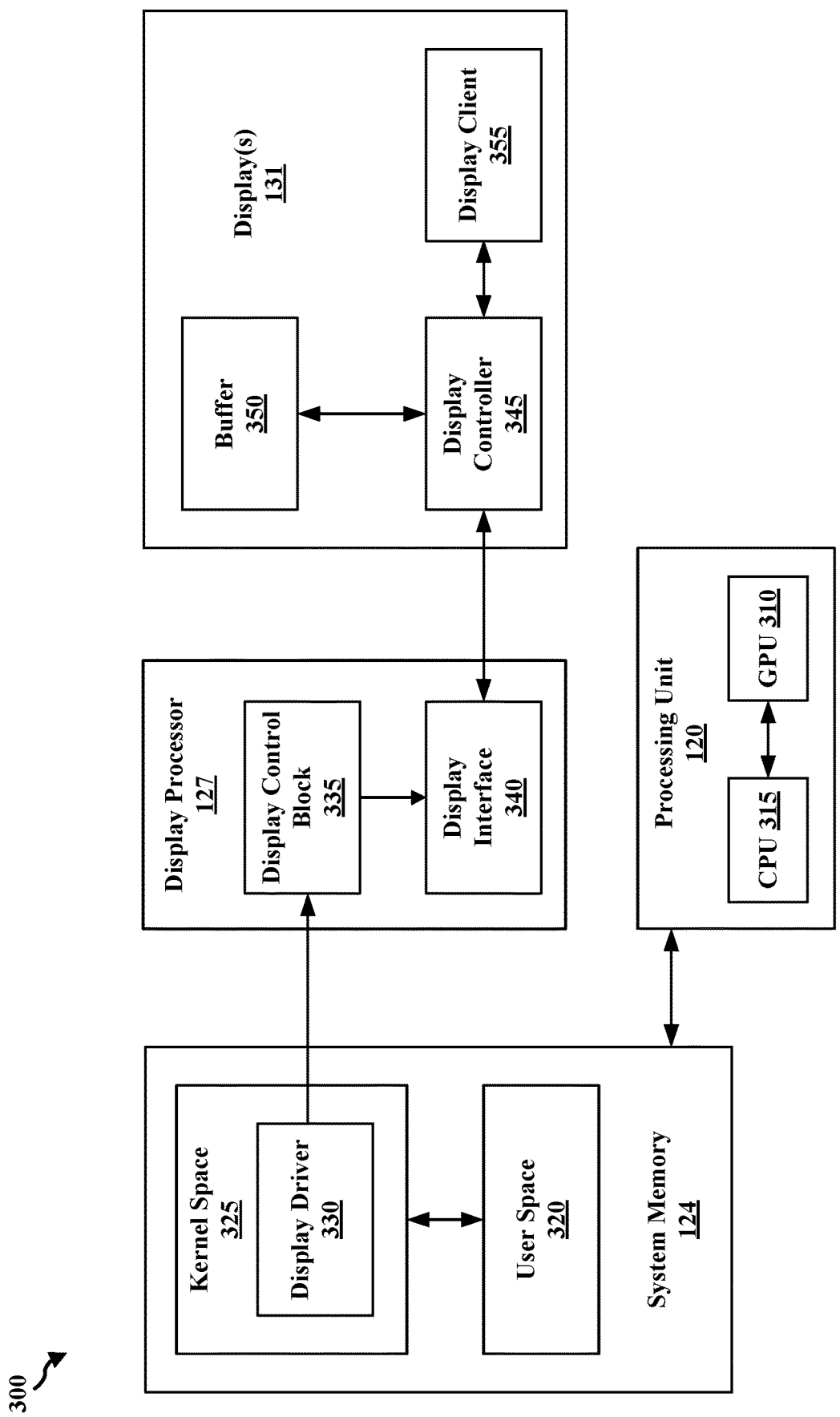
FIG. 3 illustrates an example display framework including a display processor and a display.

FIG. 3 is a block diagram 300 that illustrates an example display framework including the processing unit 120, the system memory 124, the display processor 127, and the display(s) 131, as may be identified in connection with the device 104.

A GPU may be included in devices that provide content for visual presentation on a display. For example, the processing unit 120 may include a GPU 310 configured to render graphical data for display on a computing device (e.g., the device 104), which may be a computer workstation, a mobile phone, a smartphone or other smart device, an embedded system, a personal computer, a tablet computer, a video game console, and the like. Operations of the GPU 310 may be controlled based on one or more graphics processing commands provided by a CPU 315. The CPU 315 may be configured to execute multiple applications concurrently. In some cases, each of the concurrently executed multiple applications may utilize the GPU 310 simultaneously. Processing techniques may be performed via the processing unit 120 output a frame over physical or wireless communication channels.

The system memory 124, which may be executed by the processing unit 120, may include a user space 320 and a kernel space 325. The user space 320 (sometimes referred to as an "application space") may include software application(s) and/or application framework(s). For example, software application(s) may include operating systems, media applications, graphical applications, workspace applications, etc. Application framework(s) may include frameworks used by one or more software applications, such as libraries, services (e.g., display services, input services, etc.), application program interfaces (APIs), etc. The kernel space 325 may further include a display driver 330. The display driver 330 may be configured to control the display processor 127. For example, the display driver 330 may cause the display processor 127 to compose a frame and transmit the data for the frame to a display.

The display processor 127 includes a display control block 335 and a display interface 340. The display processor 127 may be configured to manipulate functions of the display(s) 131 (e.g., based on an input received from the display driver 330). The display control block 335 may be further configured to output image frames to the display(s)

131 via the display interface 340. In some examples, the display control block 335 may additionally or alternatively perform post-processing of image data provided based on execution of the system memory 124 by the processing unit 120. The display interface 340 may be configured to cause the display(s) 131 to display image frames. The display interface 340 may output image data to the display(s) 131 according to an interface protocol, such as, for example, the MIPI DSI (Mobile Industry Processor Interface, Display Serial Interface). That is, the display(s) 131, may be configured in accordance with MIPI DSI standards. The MIPI DSI standard supports a video mode and a command mode. In examples where the display(s) 131 is/are operating in video mode, the display processor 127 may continuously refresh the graphical content of the display(s) 131. For example, the entire graphical content may be refreshed per refresh cycle (e.g., line-by-line). In examples where the display(s) 131 is/are operating in command mode, the display processor 127 may write the graphical content of a frame to a buffer 350.

In some such examples, the display processor 127 may not continuously refresh the graphical content of the display(s) 131. Instead, the display processor 127 may use a vertical synchronization (Vsync) pulse to coordinate rendering and consuming of graphical content at the buffer 350. For example, when a Vsync pulse is generated, the display processor 127 may output new graphical content to the buffer 350. Thus, generation of the Vsync pulse may indicate that current graphical content has been rendered at the buffer 350.

Frames are displayed at the display(s) 131 based on a display controller 345, a display client 355, and the buffer 350. The display controller 345 may receive image data from the display interface 340 and store the received image data in the buffer 350. In some examples, the display controller 345 may output the image data stored in the buffer 350 to the display client 355. Thus, the buffer 350 may represent a local memory to the display(s) 131. In some examples, the display controller 345 may output the image data received from the display interface 340 directly to the display client 355.

The display client 355 may be associated with a touch panel that senses interactions between a user and the display(s) 131. As the user interacts with the display(s) 131, one or more sensors in the touch panel may output signals to the display controller 345 that indicate which of the one or more sensors have sensor activity, a duration of the sensor activity, an applied pressure to the one or more sensor, etc. The display controller 345 may use the sensor outputs to determine a manner in which the user has interacted with the display(s) 131. The display(s) 131 may be further associated with/include other devices, such as a camera, a microphone, and/or a speaker, that operate in connection with the display client 355.

Some processing techniques of the device 104 may be performed over three stages (e.g., stage 1: a rendering stage; stage 2: a composition stage; and stage 3: a display/transfer stage). However, other processing techniques may combine the composition stage and the display/transfer stage into a single stage, such that the processing technique may be executed based on two total stages (e.g., stage 1: the rendering stage; and stage 2: the composition/display/transfer stage). During the rendering stage, the GPU 310 may process a content buffer based on execution of an application that generates content on a pixel-by-pixel basis. During the composition and display stage(s), pixel elements may be assembled to form a frame that is transferred to a physical display panel/subsystem (e.g., the displays 131) that displays the frame.

Instructions executed by a CPU (e.g., software instructions) or a display processor may cause the CPU or the display processor to search for and/or generate a composition strategy for composing a frame based on a dynamic priority and runtime statistics associated with one or more composition strategy groups. A frame to be displayed by a physical display device, such as a display panel, may include a plurality of layers. Also, composition of the frame may be based on combining the plurality of layers into the frame (e.g., based on a frame buffer). After the plurality of layers are combined into the frame, the frame may be provided to the display panel for display thereon. The process of combining each of the plurality of layers into the frame may be referred to as composition, frame composition, a composition procedure, a composition process, or the like.

In some aspects of graphics processing, the rendering of content may be performed in multiple locations and/or on multiple devices, e.g., in order to divide the rendering workload between different devices. For example, the rendering may be split between a server and a client device, which may be referred to as "split rendering." In some instances, split rendering may be a method for bringing content to client devices, where a portion of the graphics processing may be performed outside of the client device, e.g., at a server. In some aspects, the server may be at least one of: a phone, a smart phone, a computer, or a cloud server. Further, the client device may be at least one of: a headset, a head mounted display (HMD), display glasses, or smart glasses.

Split rendering may be performed for a number of different types of applications, e.g., virtual reality (VR) applications, augmented reality (AR) applications, and/or extended reality (XR) applications. In VR applications, the content displayed at the client device may correspond to man-made or animated content. In AR or XR content, a portion of the content displayed at the client device may correspond to real-world content, e.g., objects in the real world, and a portion of the content may be man-made or animated content. Also, the man-made or animated content and real-world content may be displayed in an optical see-through or a video see-through device, such that the user may view real-world objects and man-made or animated content simultaneously. In some aspects, man-made or animated content may be referred to as augmented content, or vice versa. Split XR or AR systems may also introduce latency when delivering the rendered content to the client display. In some aspects, this latency may be even higher when rendering occurs on a server than compared to client rendering, but it can also enable more complex XR or AR applications. In addition, there may be non-negligible latency between the time a camera pose is computed and the time the content appears on the client display. For instance, a certain amount of latency may be present in split XR or AR systems.

Figure 4:
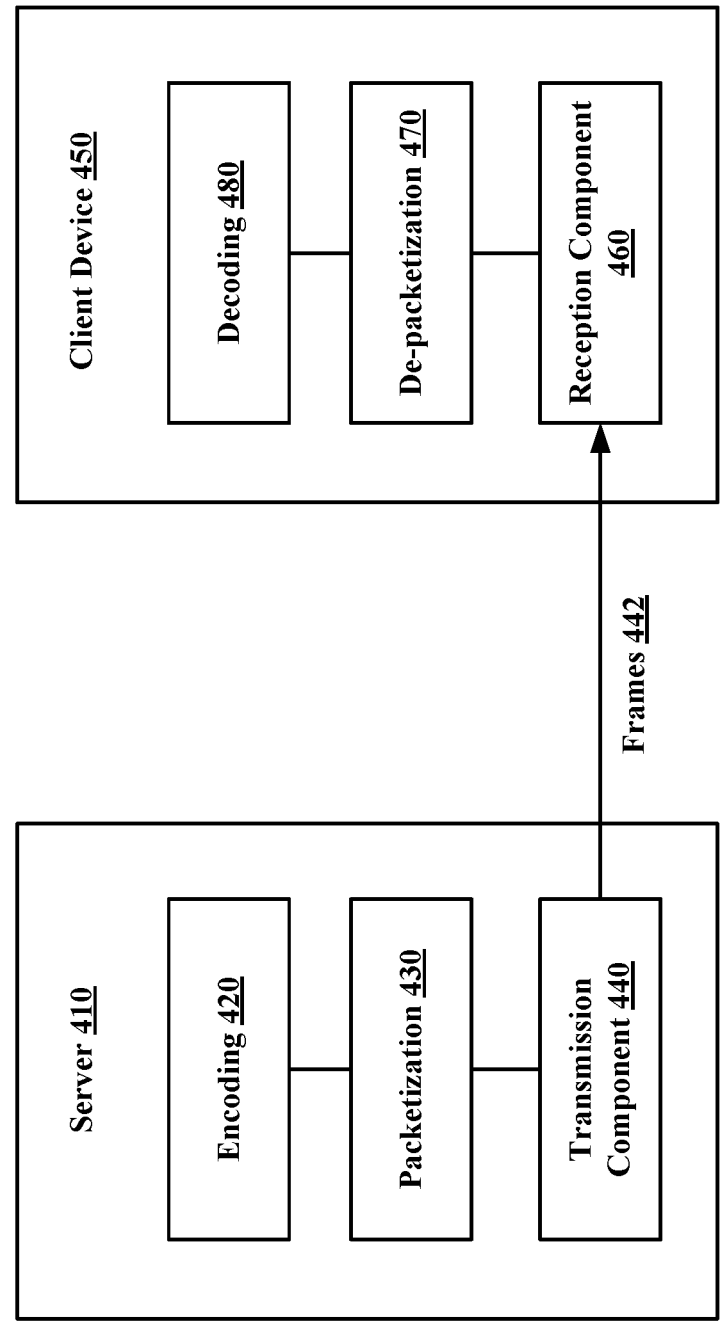
FIG. 4 is a diagram illustrating an example communication of content/data in accordance with a split rendering process.

FIG. 4 illustrates diagram 400 including communication of content/data in accordance with a split rendering process. As shown in FIG. 4, diagram 400 includes server 410 and client device 450 associated with the split rendering process. FIG. 4 shows a number of processes that are performed at the server 410 and the client device 450 including an encoding process 420, a packetization process 430, a depacketization process 470, and a decoding process 480.

Server 410 and client device 450 also include a transmission component 440 and a reception component 460, respectively.

As shown in FIG. 4, on the server 410, data/content associated with images/frames may be encoded during encoding process 420. After encoding process 420, the data/content may then undergo a packetization process 430, e.g., a real-time transport protocol (RTP) packetization process. During the packetization process, the data/content may be converted to one or more frames 442. The frames 442 may then be transmitted from the transmission component 440 of server 410 to the reception component 460 of client device 450. In some instances, the frames may be transmitted via a user datagram protocol (UDP) internet protocol (IP) (UDP/IP) network protocol. On the client device 450, the frames 442 may be received via the reception component 460, e.g., received via a UDP/IP network protocol. The frames 442 may also undergo a de-packetization process 470, e.g., a real-time transport protocol (RTP) de-packetization process, which may convert the data packets into data/content. After de-packetization, the data/content may be decoded during decoding process 480. Finally, the decoded data/content may be sent to a display or HMD of client device 450 for display of the data/content.

As indicated above, aspects of graphics processing may deal with rendering or displaying different types of content, e.g., virtual reality (VR) content, extended reality (XR), or augmented reality (AR) content. The content may be rendered or created on a server, e.g., a computer or phone. To display this content, users may utilize different types of headsets or display glasses, which may be referred to as a client device. In some instances, when a user wants to use XR glasses for a long duration in the absence of a charging facility, it is desirable to save power at the server or client device. Also, when the battery of either the client device or the server is getting low (i.e., beyond a threshold percentage decided by the user) it is desirable to save power at the server or client device. Moreover, if a user wants to extent battery life voluntarily, then it is desirable to save power at the server or client device and provide a long battery life to either device. In split rendering applications, content may be rendered on servers and encoded/streamed to XR-based HMDs over Wi-Fi. As indicated above, split rendering means the XR workload may be split between two devices, i.e., the host/server and the client/HMD. For example, one use case is a smartphone connected to HMD/AR glasses. AR glasses may not have high processing capabilities, and heat dissipation may be an issue if all the processing is performed on the client/glasses. Accordingly, it is beneficial to split the rendering between the server and the client device.

In some aspects, a user may wear a display device in order to experienced extended reality (XR) content. XR may refer to a technology that blends aspects of a digital experience and the real world. XR may include augmented reality (AR), mixed reality (MR), and/or virtual reality (VR). In AR, AR objects may be superimposed on a real-world environment as perceived through the display device. In an example, AR content may be experienced through AR glasses that include a transparent or semi-transparent surface. An AR object may be projected onto the transparent or semi-transparent surface of the glasses as a user views an environment through the glasses. In general, the AR object may not be present in the real world and the user may not interact with the AR object. In MR, MR objects may be superimposed on a real-world environment as perceived through the display device and the user may interact with the MR objects. In some aspects, MR objects may include "video see through" with virtual content added. In an example, the user may "touch" a MR object being displayed to the user (i.e., the user may place a hand at a location in the real world where the MR object appears to be located from the perspective of the user), and the MR object may "move" based on the MR object being touched (i.e., a location of the MR object on a display may change). In general, MR content may be experienced through MR glasses (similar to AR glasses) worn by the user or through a head mounted display (HMD) worn by the user. The HMD may include a camera and one or more display panels. The HMD may capture an image of environment as perceived through the camera and display the image of the environment to the user with MR objects overlaid thereon. Unlike the transparent or semi-transparent surface of the AR/MR glasses, the one or more display panels of the HMD may not be transparent or semi-transparent. In VR, a user may experience a fully-immersive digital environment in which the real-world is blocked out. VR content may be experienced through a HMD.

Currently, XR/AR/MR devices are popular and original equipment manufacturers (OEMs) are adding an increased amount of cameras (e.g., monochrome/depth cameras) on the XR/AR/MR devices. As such, an individual XR/AR/MR device may include multiple cameras utilized at the device. These multiple cameras may be used for collecting a variety of information, such as depth, higher details, sensitivity. And this information may later be fed to different algorithms to generate maps or utilized for a specific decision based on the purpose of different algorithms or scenarios. For example, tracking cameras at the XR/AR/MR device (e.g., eye, eyebrow, mouth, hand, head tracking cameras) may be connected to the device and capture all the different information, as mentioned above, and respective algorithms may utilize the same tracking cameras.

For XR/AR/MR devices utilizing digital circuits, there may be two types of power: dynamic power and leakage power. The total power in a digital circuit may be equal to the dynamic power plus the power leakage. The dynamic power may account for a high amount of the total digital power (e.g., 80-90% of the total digital power). Also, the dynamic power may be due to the switching state of flip flops in the digital circuit. Further, as an equation, the dynamic power may correspond to: $P=\alpha CV2F$, where a is the activity factor (e.g., a clock and data path gating), C is the capacitance, V is the voltage, and F is the frequency/clock. The power leakage may be a gradual loss of power, even when the circuit is powered off. For example, the leakage may be the gradual loss of component power when the voltage is on. The power leakage may account for a low amount of the total digital power (e.g., 10-20% of the total digital power). The leakage may depend on the voltage and the temperature of the circuit. Also, the power leakage may not be due to the switching state of flip flops in the digital circuit. In some aspects, the power leakage may occur when there is no clock provided to the circuit. Moreover, as an equation, the power leakage may correspond to: $P=V*l(off)$, where V is the voltage and l(off) is the inductance (e.g., the inductance when there is no clock provided). So any component in a digital circuit which is receiving voltage may tend to leak power. Additionally, when voltage is provided from a common rail in a digital circuit, there may be multiple components connected to this common rail. As explained below, the common rail is similar to multiple transmission lines in a transmission line. A rail may be a direct contact to a power source in the circuit, such that a rail may provide voltage that is distributed to several parts of the circuit.

Figure 5:
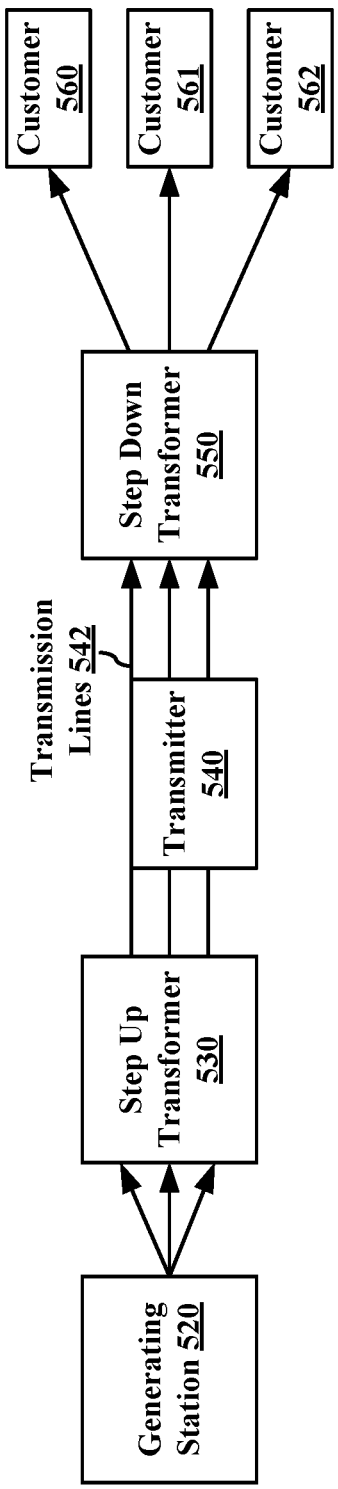
FIG. 5 is a diagram illustrating an example power generation system.

FIG. 5 is a diagram 500 illustrating an example power generation system. More specifically, FIG. 5 depicts an example power generation and transmission system for providing customers with power. As shown in FIG. 5, diagram 500 includes power generation and transmission system 510 including generating station 520, step up transformer 530, transmitter 540, transmission lines 542, step down transformer 550, and power customers (e.g., customer 560, customer 561, and customer 562). FIG. 5 depicts that power is generated at the generating station 520 and then sent to the step up transformer 530. The power is then transmitted from the step up transformer 530 to transmitter 540 (via transmission lines 542) and to the step down transformer 550. Once at the step down transformer 550, the power is distributed to the power customers (e.g., customer 560, customer 561, and customer 562).

Figure 6:
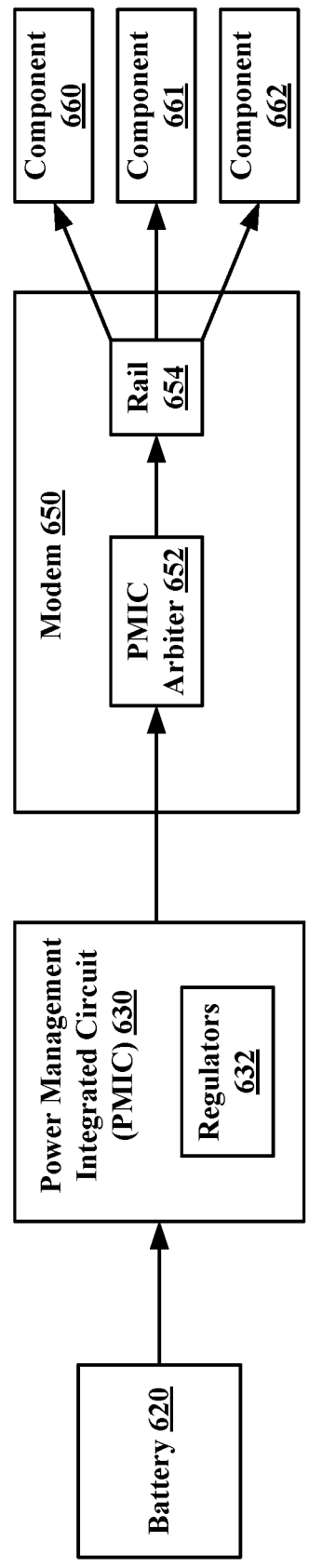
FIG. 6 is a diagram illustrating an example mobile power generation system.

FIG. 6 is a diagram 600 illustrating an example power generation system. More specifically, FIG. 6 depicts an example power generation and transmission system for a mobile device. As shown in FIG. 6, diagram 600 includes mobile power generation and transmission system 610 including battery 620, power management integrated circuit (PMIC) (e.g., PMIC 630) with regulators 632, modem 650, PMIC arbiter 652, rail 654 (e.g., common rails), and components (e.g., component 660, component 661, and component 662). FIG. 6 depicts that power is generated at the battery 620 and then sent to the PMIC 630. The regulators 632 may regulate the power that is processed through the PMIC 630. The PMIC 630 then sends power to the modem 650 including the PMIC arbiter 652. The rail 654 may help to distribute the power to different components (e.g., component 660, component 661, and component 662) in the mobile device. The mobile power generation and transmission system 610 may apply to a number of different mobile devices, such as XR/AR/MR devices.

As indicated above, the mobile components in FIG. 6 correspond to the power components in FIG. 5. For example, the battery 620 in FIG. 6 corresponds to the generating station 520 in FIG. 5. The regulators 632 in FIG. 6 correspond to the transmission lines 542 in FIG. 5, as both help to transmit power throughout the system. Also, the rail 654 help to circulate power to components throughout the mobile device (e.g., component 660, component 661, and component 662) in the mobile device. For instance, if multiple components are connected to a rail (e.g., component 660, component 661, and component 662 are connected to rail 654), if any of these components need power, the component may be powered by the rail. Also, via the rail, a component may be supplied voltage, as well as be connected to other components via the same rail. Further, these components may leak some amount of power if the components are not connected to a switch or switching device. In some aspects, if all the components connected to a shared rail (e.g., rail 654) run on a different amount of voltage, then the shared rail may select the maximum amount of the voltage for the components, and the rail may operate with that particular maximum voltage amount. As indicated above, the mobile power generation and transmission system 610 in FIG. 6 may also apply to a number of different mobile devices, such as XR/AR/MR devices.

For XR/AR/MR devices, power optimization at the device is important, even compared to other mobile devices. For instance, XR/AR/MR devices may utilize digital circuits with a large amount of components. As discussed above, any digital circuit may tend to leak power, especially digital circuits with a large amount of components (e.g., digital circuits in XR/AR/MR devices). Accordingly, leakage of power at components within a digital circuit is an important concern for XR/AR/MR devices. For example, in a camera pipeline in XR/AR/MR devices, there may be components that receive a common clock source, and because they are receiving this clock and voltage, these components may leak power. This power leakage may occur even if there is a clock gating mechanism at the components.

Figure 7:
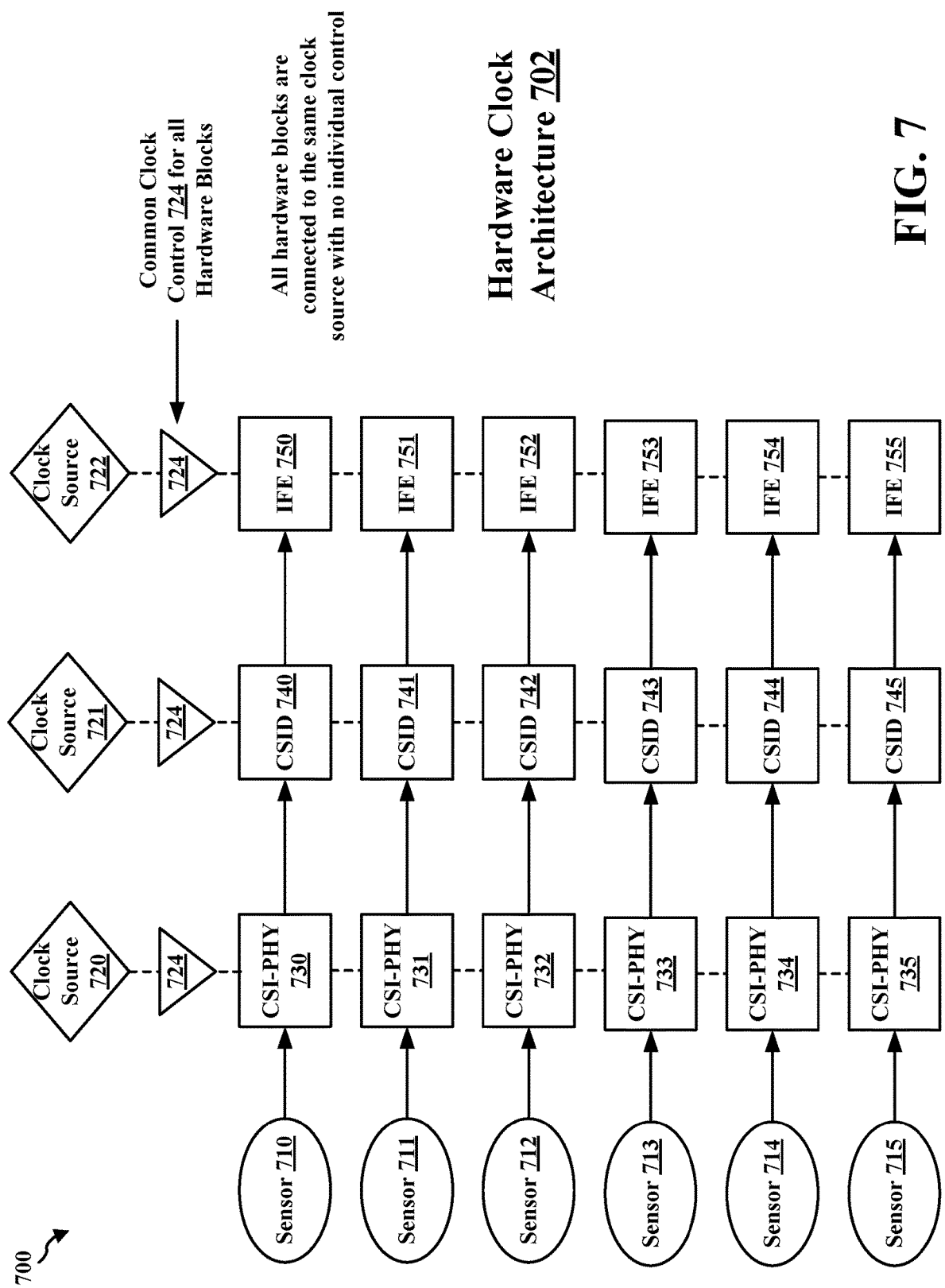
FIG. 7 is a diagram illustrating an example hardware architecture.

FIG. 7 is a diagram 700 illustrating an example hardware architecture. More specifically, FIG. 7 depicts an example hardware clock architecture for a digital circuit (e.g., a digital circuit in an XR/AR/MR device). As shown in FIG. 7, diagram 700 includes hardware clock architecture 702 including sensors (e.g., sensor 710, sensor 711, sensor 712, sensor 713, sensor 714, and sensor 715), clock sources (e.g., clock source 720, clock source 721, and clock source 722), clock control 724, camera serial interface physical layers (CSI-PHYs) (e.g., CSI-PHY 730, CSI-PHY 731, CSI-PHY 732, CSI-PHY 733, CSI-PHY 734, CSI-PHY 735), camera serial interface decoders (CSIDs) (e.g., CSID 740, CSID 741, CSID 742, CSID 743, CSID 744, CSID 745), and image signal processor (ISP) front engines (IFEs) (e.g., IFE 750, IFE 751, IFE 752, IFE 753, IFE 754, IFE 755). As shown in FIG. 7, the sensors (e.g., sensors 710-715) may be data transmitters. The clock sources (e.g., clock source 720, clock source 721, and clock source 722) may be camera clock sources (e.g., a shared clock source or a phase-locked loop (PLL) clock source). The CSI-PHYs (e.g., CSI-PHYS 730-735) may receive data (e.g., mobile industry processor interface (MIPI) data) from the sensors and sends the data to the CSIDs (e.g., CSIDs 740-745). Also, the CSIDs (e.g., CSIDs 740-745) may decode the data and send the data to the IFEs (e.g., IFEs 750-755). The CSIDs (e.g., CSIDs 740-745) and the IFEs (e.g., IFEs 750-755) may be part of an image signal processor (ISP). FIG. 7 depicts that clock control 724 may be a common clock control for all hardware blocks in the hardware clock architecture 702. For instance, all hardware blocks in hardware clock architecture 702 may be connected to the same clock control (e.g., clock control 724) with no individual control.

As shown in FIG. 7, one concern at XR/AR/MR devices is power leakage, as many components (e.g., components in a camera pipeline) are connected and running concurrently, which consumes power continuously. However, algorithms running on the XR/AR/MR device may not utilize all of the camera data to be processed. Also, the algorithms may work on a lower configuration (e.g., a lower resolution or frames-per-second (FPS)) in order to generate the necessary details. For example, an XR/AR/MR device may just need head tracking camera information and may not need any of the hand/face/eyebrow/mouth tracking camera information. Also, some cameras may run on a lower resolution and a lower FPS, as the camera may not need a higher configuration for the algorithm to process. Further, the algorithm may skip alternate frames based on the frame data in order to save power. As indicated in FIG. 7, many conditions may arise where just few cameras (e.g., monochrome cameras) may be needed at a device including different FPS/resolution configurations. However, as shown in FIG. 7, a common clock control may be utilized for all hardware blocks in the hardware clock architecture. For instance, all hardware blocks in the hardware clock architecture may be connected to the same clock source. Accordingly, the common clock control or common clock source for a number of different hardware components (many of which are not being utilized) may result in an unnecessary amount of power leakage for these components. For instance, the power leakage for each hardware component may be multiplied by the number of sensors. That is, with a high number of sensors (e.g., sensors 710-715), the power leakage for each hardware component may increase substantially. Further, current clock gating or controlling individual hardware components (e.g., CSID, IFEs, or CSI-PHYs) may not be present on devices where all device cameras are connected (e.g., depth cameras or monochrome cameras). Based on the above, it may be beneficial to reduce the amount of power leakage for hardware components in devices (e.g., XR/AR/MR devices). Also, it may be beneficial to utilize individual clock control for individual hardware components in devices (e.g., XR/AR/MR devices). Aspects of the present disclosure may reduce the amount of power leakage for hardware components in certain devices (e.g., camera devices and/or XR/AR/MR devices). For instance, aspects presented herein may utilize individual clock control or individual clock sources for individual hardware components in devices. Further, aspects presented herein may utilize a dedicated clock control for each hardware component in devices (e.g., camera devices and/or XR/AR/MR devices). Also, aspects presented herein may utilize hardware clock gating and individual clock control on each hardware block in devices (e.g., camera devices and/or XR/AR/MR devices). Aspects presented herein may also activate some hardware components, while other hardware components are clock-controlled and/or clock-gated. For example, aspects presented herein may utilize certain camera clocks that are active while other cameras clocks are clock-controlled and/or clock-gated. Moreover, by utilizing clock gating, each hardware component may receive voltage but no clock, so the amount of power leakage may be reduced substantially.

In some instances, aspects presented herein may provide individual clock control for each hardware component (e.g., a hardware component in a digital circuit of device utilizing cameras, such as an XR/AR/MR device). For instance, the CPU (e.g., software at a CPU) may program this individual clock control for each hardware component based on the need of the hardware component. In one example, the CPU (e.g., software at a CPU) may determine the number of sensors that are active for the digital circuit, and then determine the individual clock control for each hardware component based on number of sensors. The CPU may control the supply of the clock to these hardware components (e.g., a hardware component in a digital circuit of device utilizing cameras, such as an XR/AR/MR device) and provide the ability to optimize the power leakage at these hardware components. By doing so, the amount of power leakage may be significantly reduced for each of these components in the circuit (e.g., a digital circuit). Also, the CPU may utilize clock gating for each component in the circuit, such that each hardware component may receive voltage but no clock, thus optimizing the amount of power leakage for each component.

In some aspects, the CPU may designate a number of bits based on a corresponding number of active sensors (e.g., data transmitters in the circuit). For instance, the CPU may determine that a certain amount of sensors is active (e.g., two sensors are active), so the CPU may enable these bits that correspond to the amount of active sensors (e.g., two bits). Accordingly, aspects presented herein may supply the clock to these sensors and the corresponding hardware components. For example, the CPU may determine that two sensors are active in the digital circuit that correspond to components (e.g., image signal processors (ISPs)), and then supply the clock for the corresponding components. If the CPU determines that the sensors are inactive, then the CPU may eliminate the supply of the clock. By doing so, the amount of power leakage may be reduced based on supplying the clock to active sensors and/or eliminating the supply of the clock to inactive sensors. This supply of the clock or clock source to the hardware components may be based on selecting a clock configuration for the hardware components that is associated with the determination of whether each of the sensors in the circuit is an active sensor or an inactive sensor. Aspects presented herein may also set a clock control for each of the hardware components based on the selected clock configuration.

Additionally, in order to control different hardware component clocks, aspects presented herein may utilize software (e.g., software at a CPU) and/or hardware control on individual hardware component clocks. Aspects presented herein may utilize individual clocks and/or clock sources for individual hardware components (e.g., a hardware component in a digital circuit of device utilizing cameras, such as an XR/AR/MR device). This is in contrast to current solutions where a single clock source is connected to all hardware components (as shown in FIG. 7). Hence, in current solutions, all hardware component (e.g., IFEs in FIG. 7) clocks may be active and may consume idle power even if the hardware component (e.g., IFEs in FIG. 7) does not have any processing task. That is, in current solutions, a single clock source may be utilized for all hardware components (e.g., CSIDs and CSI-PHYs in FIG. 7) and all respective hardware blocks clocks may be on and consume idle power, thus resulting in a high amount of power leakage for all hardware components. Aspects presented herein may solve this power leakage issue for hardware components by utilizing individual clocks and/or individual clock sources for individual hardware components (e.g., a hardware component in a digital circuit of device utilizing cameras, such as an XR/AR/MR device). Accordingly, by utilizing individual clocks/clock sources for individual hardware components, aspects presented herein may provide a solution for the aforementioned power leakage and idle power issues. Further, aspects presented herein may provide hardware clock gating support for individual hardware components (e.g., a hardware component in a digital circuit of an XR/AR/MR device). By adding hardware clock gating support at each hardware component (e.g., CSI-PHY, CSID, IFE) for all logic in a digital circuit, aspects presented herein may provide a clock gate to active sensors and inactive sensors, as well as corresponding hardware blocks. By providing a clock gate to active/inactive sensors and corresponding hardware blocks, aspects presented herein may save idle power and/or power leakage. Aspects presented herein may also add hardware control logic and CPU/software register support from a clock tree to all hardware components (e.g., a hardware component in a digital circuit of device utilizing cameras, such as an XR/AR/MR device). By doing so, aspects presented herein may allow the corresponding clocks/clock sources to be connected/controlled for all hardware components (e.g., a hardware component in a digital circuit of device utilizing cameras, such as an XR/AR/MR device). Aspects presented herein may also provide hardware clock gating support to other hardware components/blocks of a hardware system if these components/blocks do not have hardware clock gating support. In one example, a single hardware block/component may consume power and the remaining hardware blocks/components may be clock gated and may not consume power. Additionally, in order to provide power optimization, CPUs may utilize hardware clock gating support for each hardware block/component. Also, in order to minimize the idle power impact, CPUs may reduce the FPS/resolution of active hardware blocks/components, so the overall clock/idle power consumption may be reduced. Moreover, each hardware block in the system may be clock gated and controlled, so that the hardware blocks can be clock gated/switched off when not in use.

Figure 8:
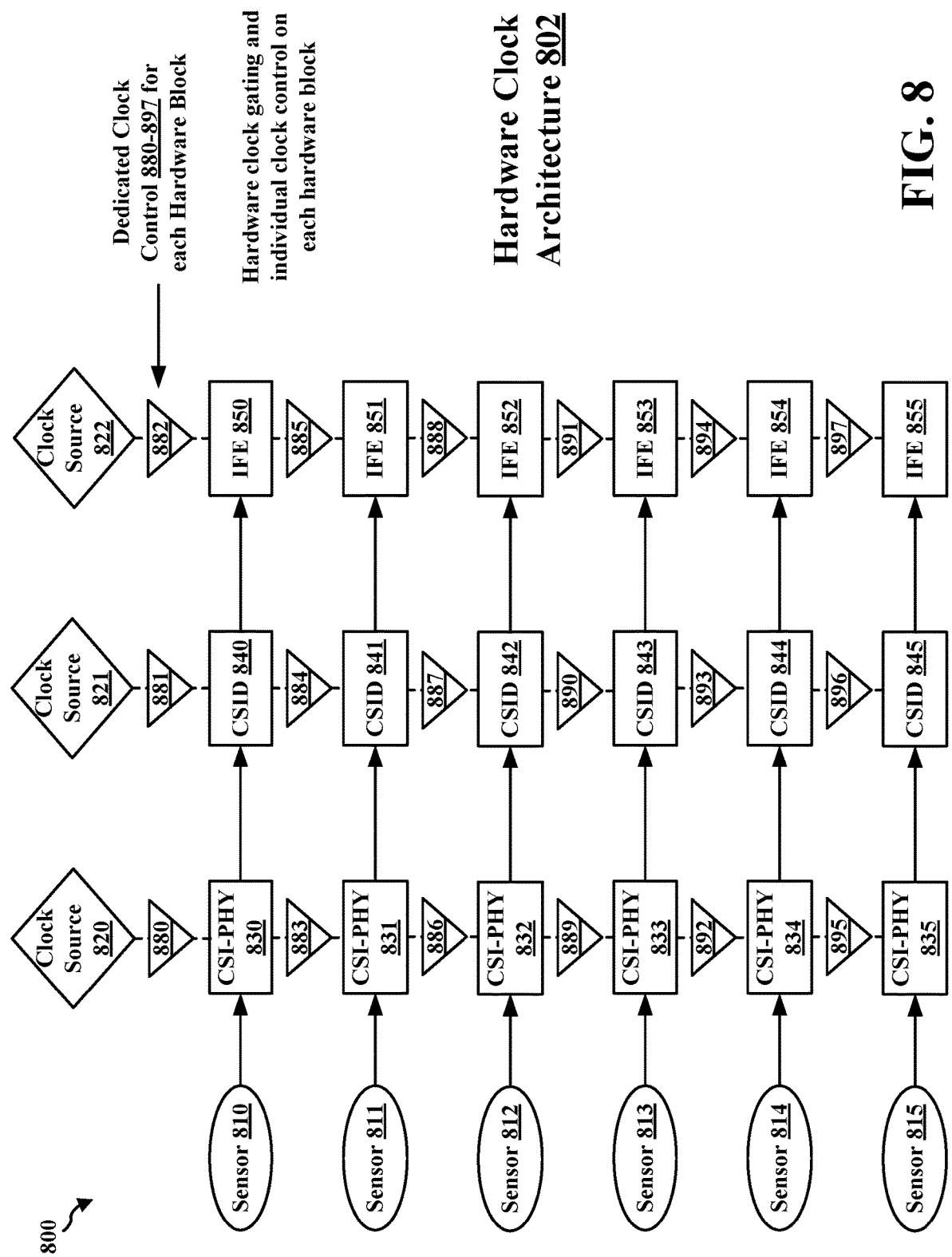
FIG. 8 is a diagram illustrating an example hardware architecture.

FIG. 8 is a diagram 800 illustrating an example hardware architecture. More specifically, FIG. 8 depicts an example hardware clock architecture for a digital circuit (e.g., a digital circuit in an XR/AR/MR device). As shown in FIG. 8, diagram 800 includes hardware clock architecture 802 including sensors (e.g., sensor 810, sensor 811, sensor 812, sensor 813, sensor 814, and sensor 815), clock sources (e.g., clock source 820, clock source 821, and clock source 822), a number of clock controls (e.g., clock control 880, clock control 881, clock control 882, clock control 883, clock control 884, clock control 885, clock control 886, clock control 887, clock control 888, clock control 889, clock control 890, clock control 891, clock control 892, clock control 893, clock control 894, clock control 895, clock control 896, and clock control 897), camera serial interface physical layers (CSI-PHYs) (e.g., CSI-PHY 830, CSI-PHY 831, CSI-PHY 832, CSI-PHY 833, CSI-PHY 834, CSI-PHY 835), camera serial interface decoders (CSIDs) (e.g., CSID 840, CSID 841, CSID 842, CSID 843, CSID 844, CSID 845), and image signal processor (ISP) front engines (IFEs) (e.g., IFE 850, IFE 851, IFE 852, IFE 853, IFE 854, IFE 855). As shown in FIG. 8, the sensors (e.g., sensors 810-815) may be data transmitters. The clock sources (e.g., clock source 820, clock source 821, and clock source 822) may be camera clock sources (e.g., a shared clock source or a phase-locked loop (PLL) clock source). The clock source may manage how the component derives its clock. In digital circuits, a clock or clock signal (i.e., a logic beat) may be an electronic logic signal (e.g., voltage or current) which oscillates between a high and a low state at a constant frequency and is used to synchronize actions of digital circuits. In a synchronous logic circuit, the clock signal may be applied to all components (e.g., storage devices, flip-flops, and latches) and cause the components to all change state simultaneously. A clock signal is produced by an electronic oscillator called a clock generator. The CSI-PHYs (e.g., CSI-PHYs 830-835) may receive data (e.g., mobile industry processor interface (MIPI) data) from the sensors and sends the data to the CSIDs (e.g., CSIDs 840-845). Also, the CSIDs (e.g., CSIDs 840-845) may decode the data and send the data to the IFEs (e.g., IFEs 850-855). The CSIDs (e.g., CSIDs 840-845) and the IFEs (e.g., IFEs 850-855) may be part of an image signal processor (ISP).

FIG. 8 depicts that clock controls 880-897 may each be a dedicated clock control for each individual hardware block in the hardware clock architecture 802. For instance, each hardware block in hardware clock architecture 802 may include its own individual clock control (e.g., clock controls 880-897) with individual control for each component. For example, as shown in FIG. 8, clock control 880 may be dedicated for CSI-PHY 830, clock control 881 may be dedicated for CSID 840, clock control 882 may be dedicated for IFE 850, clock control 883 may be dedicated for CSI-PHY 831, clock control 884 may be dedicated for CSID 841, clock control 885 may be dedicated for IFE 851, clock control 886 may be dedicated for CSI-PHY 832, clock control 887 may be dedicated for CSID 842, clock control 888 may be dedicated for IFE 852, clock control 889 may be dedicated for CSI-PHY 833, clock control 890 may be dedicated for CSID 843, clock control 891 may be dedicated for IFE 853, clock control 892 may be dedicated for CSI-PHY 834, clock control 893 may be dedicated for CSID 844, clock control 894 may be dedicated for IFE 854, clock control 895 may be dedicated for CSI-PHY 835, clock control 896 may be dedicated for CSID 845, and clock control 897 may be dedicated for IFE 855. Also, as shown in FIG. 8, there may be hardware clock gating and individual clock control (e.g., clock controls 880-897) on each hardware block (e.g., CSI-PHYs 830-835, CSIDs 840-845, and IFEs 850-855).

As depicted in FIG. 8, CPUs may provide or program individual clock control (e.g., clock controls 880-897) for each hardware component (e.g., CSI-PHYs 830-835, CSIDs 840-845, and IFEs 850-855). In one aspect, the CPU (e.g., software at a CPU) may determine the number of sensors that are active/inactive for the digital circuit (e.g., sensors 810-815), and then determine the individual clock control (e.g., clock controls 880-897) for each hardware component (e.g., CSI-PHYs 830-835, CSIDs 840-845, and IFEs 850-855) based on number of sensors (e.g., sensors 810-815). As shown in FIG. 8, the CPU may control the supply of the clock (e.g., clock controls 880-897) to these hardware components (e.g., CSI-PHYs 830-835, CSIDs 840-845, and IFEs 850-855) and provide the ability to optimize the power leakage at the hardware components. Based on this, the amount of power leakage may be significantly reduced for each of these components (e.g., CSI-PHYs 830-835, CSIDs 840-845, and IFEs 850-855) in hardware clock architecture 802. Further, the CPU may utilize clock gating for each component (e.g., CSI-PHYs 830-835, CSIDs 840-845, and IFEs 850-855) in hardware clock architecture 802, such that each hardware component may receive voltage but no clock, thus optimizing the amount of power leakage for each component.

As further shown in FIG. 8, the CPU may designate a number of bits based on a corresponding number of active/inactive sensors (e.g., sensors 810-815). For instance, the CPU may determine that a certain amount of sensors is active (e.g., sensors 810-815), so the CPU may enable these bits that correspond to the amount of active sensors (e.g., six bits corresponding to sensors 810-815). In one example, the CPU may determine that certain sensors are active (e.g., 3 sensors in sensors 810-815) that correspond to certain components (e.g., CSI-PHYs 830-835, CSIDs 840-845, and IFEs 850-855), and then supply the clock for the corresponding components. If the CPU determines that the sensors are inactive (e.g., 3 sensors in sensors 810-815), then the CPU may eliminate the supply of the clock for these corresponding components. Based on this, the amount of power leakage may be reduced by supplying the clock to active sensors (e.g., sensors 810-815) and/or eliminating the supply of the clock to inactive sensors (e.g., sensors 810-815).

Additionally, as shown in FIG. 8, in order to control different hardware component clocks, aspects presented herein may utilize software (e.g., software at a CPU) and/or hardware control on individual hardware component clocks (e.g., clock controls 880-897). Aspects presented herein may utilize individual clocks (e.g., clock controls 880-897) and/or clock sources (e.g., clock sources 820-822) for individual hardware components (e.g., CSI-PHYS 830-835, CSIDs 840-845, and IFEs 850-855). By doing so, aspects presented herein may reduce the amount of power leakage for hardware components by utilizing individual clocks (e.g., clock controls 880-897) and/or clock sources (e.g., clock sources 820-822) for individual hardware components (e.g., CSI-PHYS 830-835, CSIDs 840-845, and IFEs 850-855). That is, by utilizing individual clocks/clock sources for individual hardware components, aspects presented herein may reduce the amount of power leakage individual hardware components (e.g., CSI-PHYS 830-835, CSIDs 840-845, and IFEs 850-855) based on determining whether sensors (e.g., sensors 810-815) are active or inactive.

As further shown in FIG. 8, aspects presented herein may provide hardware clock gating support for individual hardware components (e.g., CSI-PHYs 830-835, CSIDs 840-845, and IFEs 850-855). By adding hardware clock gating support (e.g., clock controls 880-897) at each hardware component (e.g., CSI-PHYs 830-835, CSIDs 840-845, and IFEs 850-855) for all logic in a digital circuit, aspects presented herein may provide a clock gate to active/inactive sensors (e.g., sensors 810-815). Further, by providing a clock gate (e.g., clock controls 880-897) to active/inactive sensors (e.g., sensors 810-815) and corresponding hardware blocks (e.g., CSI-PHYs 830-835, CSIDs 840-845, and IFEs 850-855), aspects presented herein may reduce the amount of idle power and/or power leakage. As indicated in FIG. 8, CPUs herein may add hardware control logic and CPU/software register support from a clock tree to all hardware components (e.g., CSI-PHYs 830-835, CSIDs 840-845, and IFEs 850-855) in hardware clock architecture 802. By doing so, aspects presented herein may allow the corresponding clocks/clock sources to be connected/controlled for all hardware components (e.g., CSI-PHYS 830-835, CSIDs 840-845, and IFEs 850-855) in hardware clock architecture 802. As further depicted in FIG. 8, aspects presented herein may provide hardware clock gating support to other hardware components/blocks of a hardware system (e.g., outside of hardware clock architecture 802) if these components/blocks do not have hardware clock gating support.

In some aspects, as shown in FIG. 8, a CPU may obtain an indication of a set of sensors (e.g., sensors 810-815) that are connected to at least one clock source (e.g., clock sources 820-822) at a device (e.g., an XR/AR/MR device). The CPU may detect whether each of the set of sensors (e.g., sensors 810-815) is an active sensor or an inactive sensor. Further, the CPU may select a clock configuration for a set of hardware components (e.g., CSI-PHYs 830-835, CSIDs 840-845, and IFEs 850-855) at the device based on the detection of whether each of the set of sensors (e.g., sensors 810-815) is an active sensor or an inactive sensor, where the clock configuration is associated with the at least one clock source (e.g., clock sources 820-822). The clock configuration may be a configuration of the clock, clock controls, and/or clock source for components in a circuit. The CPU may also output an indication of the selected clock configuration for the set of hardware components (e.g., CSI-PHYs 830-835, CSIDs 840-845, and IFEs 850-855) at the device. In some aspects, the CPU may transmit, to a hardware controller, an indication of the selected clock configuration for the set of hardware components (e.g., CSI-PHYs 830-835, CSIDs 840-845, and IFEs 850-855) at the device.

As further shown in FIG. 8, a CPU may set a clock control (e.g., clock controls 880-897) for each of the set of hardware components (e.g., CSI-PHYs 830-835, CSIDs 840-845, and IFEs 850-855) based on a selected clock configuration, where the clock control (e.g., clock controls 880-897) is associated with the at least one clock source (e.g., clock sources 820-822). The clock control may control the amount of clock or clock signal for each block/component in the circuit. Also, a CPU may receive an indication of a clock for each of the set of hardware components (e.g., CSI-PHYs 830-835, CSIDs 840-845, and IFEs 850-855) prior to setting the clock control (e.g., clock controls 880-897) for each of the set of hardware components, where the clock is associated with the at least one clock source (e.g., clock sources 820-822). Further, a CPU may transmit an indication of the at least one clock source (e.g., clock sources 820-822) for each of the set of hardware components (e.g., CSI-PHYs 830-835, CSIDs 840-845, and IFEs 850-855) prior subsequent to setting the clock control (e.g., clock controls 880-897) for each of the set of hardware components. In some aspects, setting the clock control for each of the set of hardware components may include (e.g., comprise): enabling a logic of the clock for each of the set of hardware components (e.g., CSI-PHYs 830-835, CSIDs 840-845, and IFEs 850-855). Moreover, a CPU may write, if a certain sensor in the set of sensors (e.g., sensors 810-815) is an inactive sensor, an indication to not provide a clock for the at least one clock source (e.g., clock sources 820-822).

Aspects presented herein may include a number of benefits or advantages. For instance, in order to minimize power leakage and/or the idle power at hardware components, aspects presented herein may reduce the FPS/resolution of active hardware blocks/components, so the overall clock/idle power consumption may be reduced. Moreover, aspects presented herein may allow for each hardware block in a system to be clock gated and controlled, so that the hardware blocks can be clock gated/switched off when not in use. Aspects presented herein may reduce the amount of power leakage and/or idle power for hardware components in certain devices (e.g., camera devices and/or XR/AR/MR devices). To reduce the amount of power leakage and/or idle power at each component, aspects presented herein may utilize individual clock control or individual clock sources for individual hardware components in devices. Moreover, aspects presented herein may utilize a dedicated clock control for each hardware component in devices (e.g., camera devices and/or XR/AR/MR devices). Additionally, aspects presented herein may utilize hardware clock gating and individual clock control on each hardware block in devices (e.g., camera devices and/or XR/AR/MR devices). Also, aspects presented herein may activate some hardware components, while other hardware components are clock-controlled and/or clock-gated. For example, aspects presented herein may utilize certain camera clocks that are active while other cameras clocks are clock-controlled and/or clock-gated. Moreover, by utilizing clock gating, each hardware component may receive voltage but no clock, so the amount of power leakage and/or idle power at each hardware component may be reduced substantially.

Figure 9:
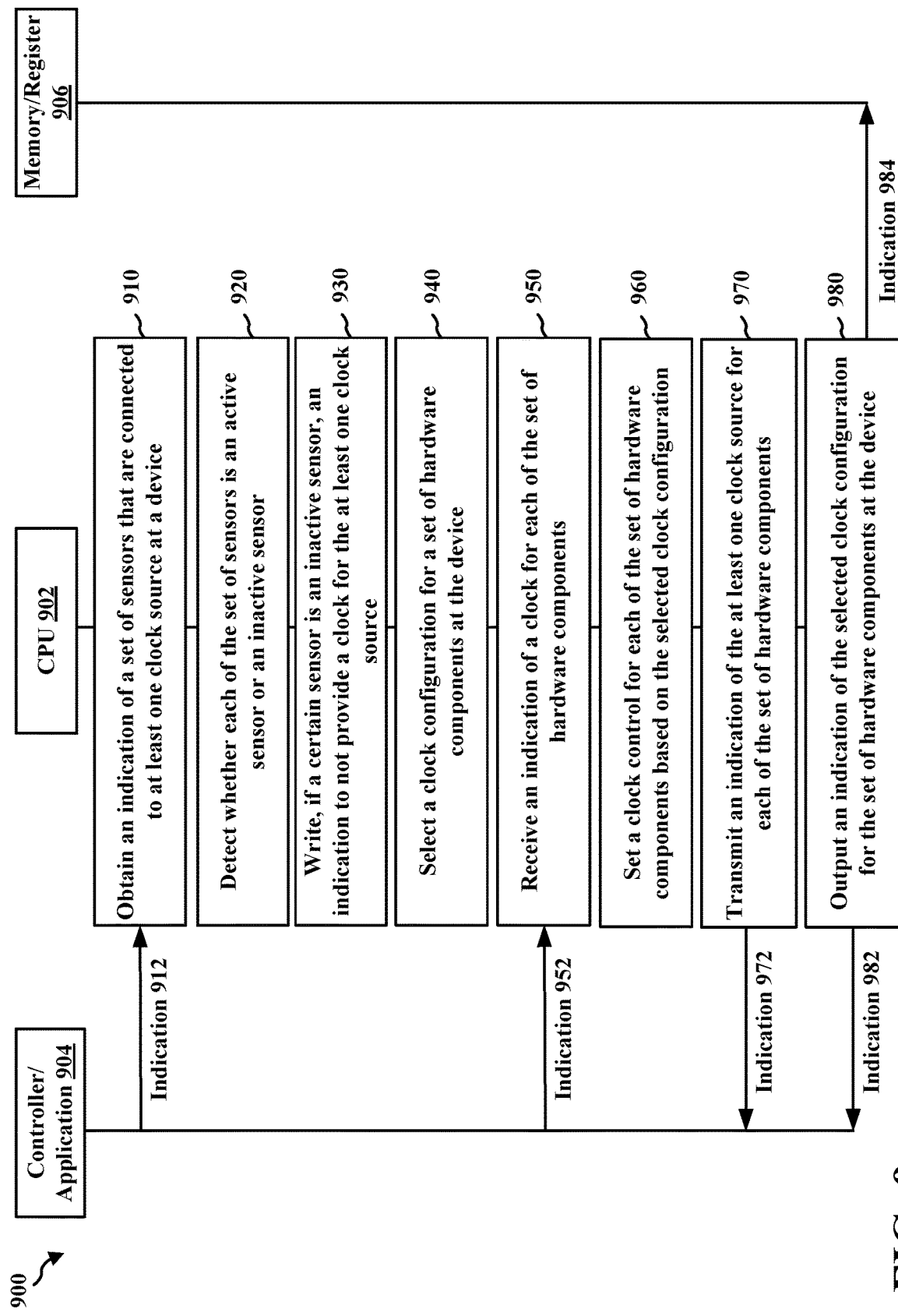
FIG. 9 is a communication flow diagram illustrating example communications between a CPU, a controller/application, and a memory/register.

FIG. 9 is a communication flow diagram 900 of display processing in accordance with one or more techniques of this disclosure. As shown in FIG. 9, diagram 900 includes example communications between CPU 902 (e.g., a DPU driver, other central processor, or display processor), controller/application 904 (e.g., a hardware controller, an application, or a GPU), and memory/register 906 (e.g., a memory or a register at a CPU or GPU), in accordance with one or more techniques of this disclosure.

At 910, CPU 902 may obtain an indication of a set of sensors that are connected to at least one clock source at a device (e.g., CPU 902 may receive indication 912 from controller/application 904). The at least one clock source may be a shared clock source, a shared voltage source, or a shared clock and voltage source. Also, each of the set of sensors may be at least one of: a data transmitter, a camera sensor, a component sensor, or a microphone. Further, if the device is a camera, each of the set of sensors may be the camera sensor.

At 920, CPU 902 may detect whether each of the set of sensors is an active sensor or an inactive sensor. An active sensor may be associated with at least one of actively streaming data or leaking voltage, and an inactive sensor may be associated with at least one of being powered off or not actively streaming data.

At 930, CPU 902 may write, if a certain sensor in the set of sensors is the inactive sensor, an indication to not provide a clock for the at least one clock source.

At 940, CPU 902 may select a clock configuration for a set of hardware components at the device based on the detection of whether each of the set of sensors is the active sensor or the inactive sensor, where the clock configuration is associated with the at least one clock source. In some aspects, selecting the clock configuration may include selecting the clock configuration based on a certain sensor in the set of sensors being an active sensor. Also, the clock configuration may be a hardware clock control configuration of the at least one clock source. The hardware clock control configuration may be enabled or disabled based on a software configuration for the device. Further, the clock configuration may be a shared clock configuration or a shared voltage configuration for each of the set of hardware components, where the at least one clock source may be a shared clock source or a shared voltage source. The set of hardware components may include at least one of: a camera serial interface physical layer (CSI-PHY), a camera serial interface decoder (CSID), an image signal processor (ISP), or an ISP front engine (IFE).

At 950, CPU 902 may receive an indication of a clock for each of the set of hardware components prior to setting the clock control for each of the set of hardware components, where the clock is associated with the at least one clock source (e.g., CPU 902 may receive indication 952 from controller/application 904).

At 960, CPU 902 may set a clock control for each of the set of hardware components based on the selected clock configuration, where the clock control is associated with the at least one clock source. In some aspects, setting the clock control for each of the set of hardware components may include: enabling a logic of the clock for each of the set of hardware components. That is, CPU may enable a logic of the clock for each of the set of hardware components.

At 970, CPU 902 may transmit an indication of the at least one clock source for each of the set of hardware components subsequent to setting the clock control for each of the set of hardware components (e.g., CPU 902 may transmit indication 972 to controller/application 904).

At 980, CPU 902 may output an indication of the selected clock configuration for the set of hardware components at the device. In some aspects, outputting the indication of the selected clock configuration may include (e.g., comprise): transmitting the indication of the selected clock configuration for the set of hardware components at the device. Also, transmitting the indication of the selected clock configuration may include: transmitting the indication of the selected clock configuration to a hardware controller (e.g., CPU 902 may transmit indication 982 to controller/application 904). In some aspects, outputting the indication of the selected clock configuration may include: storing the indication of the selected clock configuration for the set of hardware components at the device. Further, storing the indication of the selected clock configuration may include: storing the indication of the selected clock configuration at a hardware register or a hardware memory (e.g., CPU 902 may store indication 984 in memory/register 906).

Figure 10:
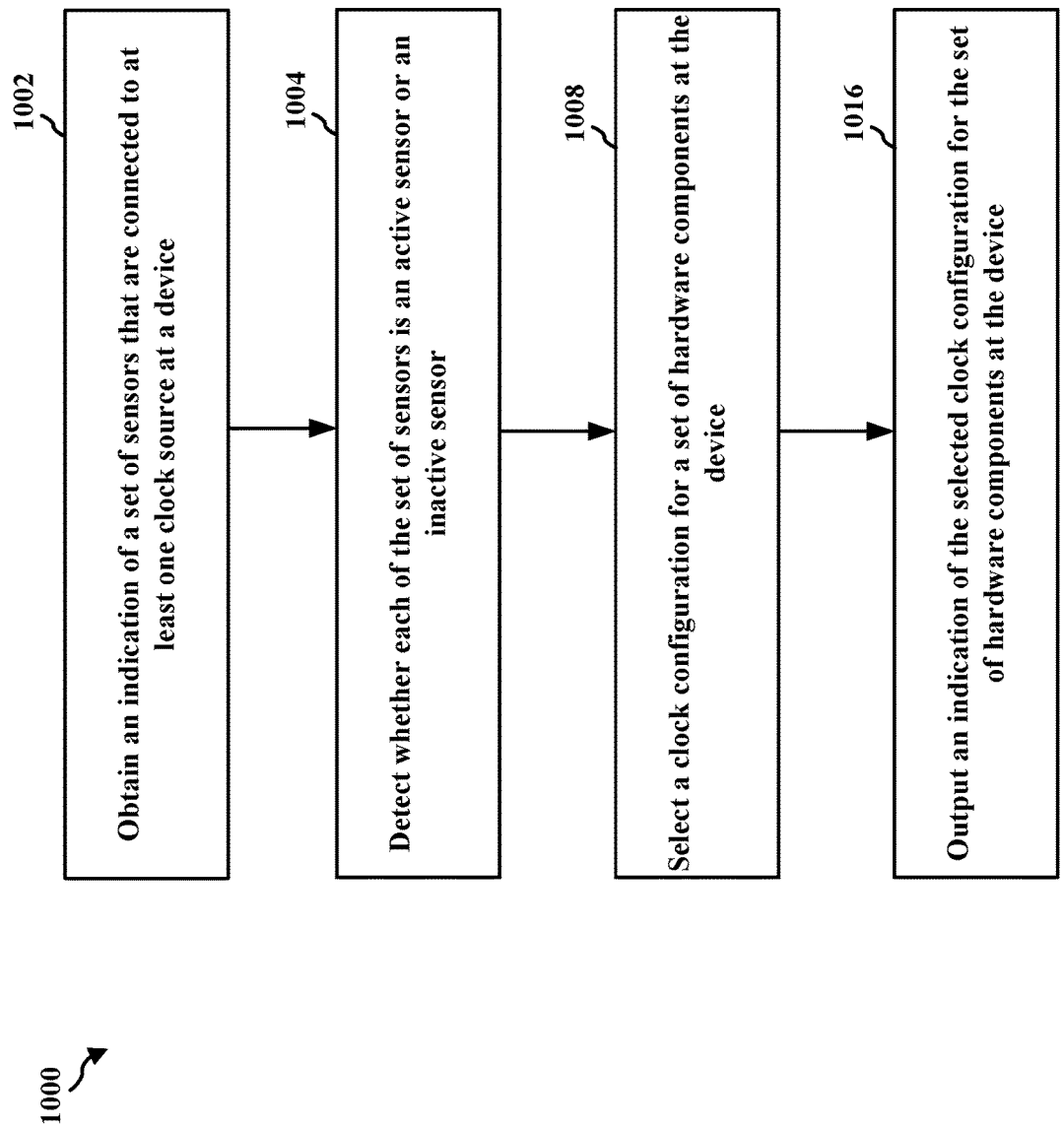
FIG. 10 is a flowchart of an example method of data processing.

FIG. 10 is a flowchart 1000 of an example method of data processing in accordance with one or more techniques of this disclosure. The method may be performed by a CPU (or other central processor), a DPU driver, a DPU (or other display processor), a GPU (or other graphics processor), a DDIC, an apparatus for display processing, a wireless communication device, and/or any apparatus that may perform data processing as used in connection with the examples of FIGS. 1-9.

At 1002, the CPU may obtain an indication of a set of sensors that are connected to at least one clock source at a device, as described in connection with the examples in FIGS. 1-9. For example, as described in 910 of FIG. 9, CPU 902 may obtain an indication (e.g., indication 912) of a set of sensors that are connected to at least one clock source at a device. Further, step 1002 may be performed by processing unit 120 in FIG. 1. The at least one clock source may be a shared clock source, a shared voltage source, or a shared clock and voltage source. Also, each of the set of sensors may be at least one of: a data transmitter, a camera sensor, a component sensor, or a microphone. Further, if the device is a camera, each of the set of sensors may be the camera sensor.

At 1004, the CPU may detect whether each of the set of sensors is an active sensor or an inactive sensor, as described in connection with the examples in FIGS. 1-9. For example, as described in 920 of FIG. 9, CPU 902 may detect whether each of the set of sensors is an active sensor or an inactive sensor. Further, step 1004 may be performed by processing unit 120 in FIG. 1. An active sensor may be associated with at least one of actively streaming data or leaking voltage, and an inactive sensor may be associated with at least one of being powered off or not actively streaming data.

At 1008, the CPU may select a clock configuration for a set of hardware components at the device based on the detection of whether each of the set of sensors is the active sensor or the inactive sensor, where the clock configuration is associated with the at least one clock source, as described in connection with the examples in FIGS. 1-9. For example, as described in 940 of FIG. 9, CPU 902 may select a clock configuration for a set of hardware components at the device based on the detection of whether each of the set of sensors is the active sensor or the inactive sensor, where the clock configuration is associated with the at least one clock source. Further, step 1008 may be performed by processing unit 120 in FIG. 1. In some aspects, selecting the clock configuration may include selecting the clock configuration based on a certain sensor in the set of sensors being an active sensor. Also, the clock configuration may be a hardware clock control configuration of the at least one clock source. The hardware clock control configuration may be enabled or disabled based on a software configuration for the device. Further, the clock configuration may be a shared clock configuration or a shared voltage configuration for each of the set of hardware components, where the at least one clock source may be a shared clock source or a shared voltage source. The set of hardware components may include at least one of: a camera serial interface physical layer (CSI-PHY), a camera serial interface decoder (CSID), an image signal processor (ISP), or an ISP front engine (IFE).

At 1016, the CPU may output an indication of the selected clock configuration for the set of hardware components at the device, as described in connection with the examples in FIGS. 1-9. For example, as described in 980 of FIG. 9, CPU 902 may output an indication of the selected clock configuration for the set of hardware components at the device. Further, step 1016 may be performed by processing unit 120 in FIG. 1. In some aspects, outputting the indication of the selected clock configuration may include (e.g., comprise): transmitting the indication of the selected clock configuration for the set of hardware components at the device. Also, transmitting the indication of the selected clock configuration may include: transmitting the indication (e.g., indication 982) of the selected clock configuration to a hardware controller. In some aspects, outputting the indication of the selected clock configuration may include: storing the indication of the selected clock configuration for the set of hardware components at the device. Further, storing the indication of the selected clock configuration may include: storing the indication (e.g., indication 984) of the selected clock configuration at a hardware register or a hardware memory.

Figure 11:
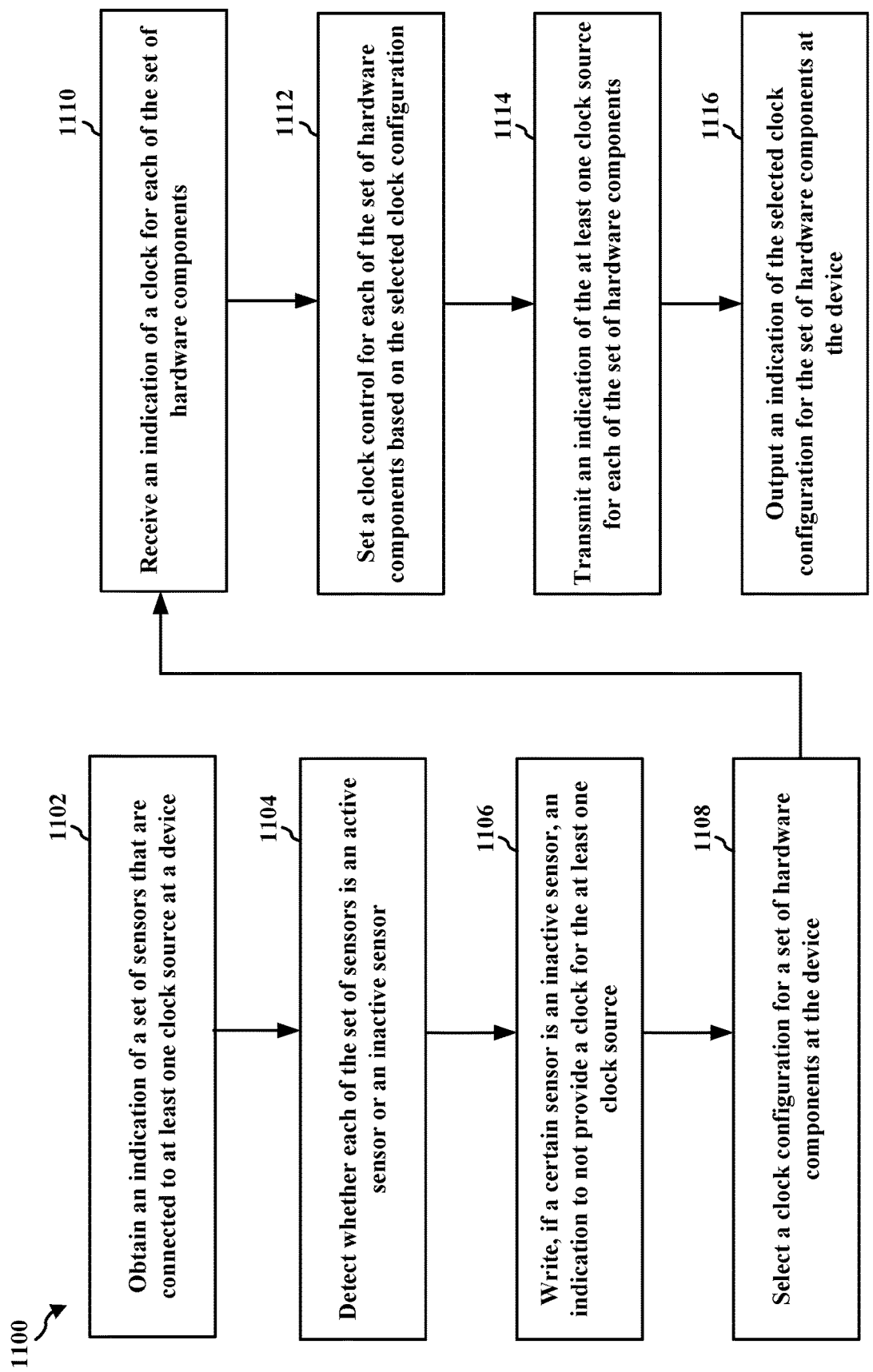
FIG. 11 is a flowchart of an example method of data processing.

FIG. 11 is a flowchart 1100 of an example method of data processing in accordance with one or more techniques of this disclosure. The method may be performed by a CPU (or other central processor), a DPU driver, a DPU (or other display processor), a GPU (or other graphics processor), a DDIC, an apparatus for display processing, a wireless communication device, and/or any apparatus that may perform data processing as used in connection with the examples of FIGS. 1-9.

At 1102, the CPU may obtain an indication of a set of sensors that are connected to at least one clock source at a device, as described in connection with the examples in FIGS. 1-9. For example, as described in 910 of FIG. 9. CPU 902 may obtain an indication (e.g., indication 912) of a set of sensors that are connected to at least one clock source at a device. Further, step 1102 may be performed by processing unit 120 in FIG. 1. The at least one clock source may be a shared clock source, a shared voltage source, or a shared clock and voltage source. Also, each of the set of sensors may be at least one of: a data transmitter, a camera sensor, a component sensor, or a microphone. Further, if the device is a camera, each of the set of sensors may be the camera sensor.

At 1104, the CPU may detect whether each of the set of sensors is an active sensor or an inactive sensor, as described in connection with the examples in FIGS. 1-9. For example, as described in 920 of FIG. 9, CPU 902 may detect whether each of the set of sensors is an active sensor or an inactive sensor. Further, step 1104 may be performed by processing unit 120 in FIG. 1. An active sensor may be associated with at least one of actively streaming data or leaking voltage, and an inactive sensor may be associated with at least one of being powered off or not actively streaming data.

At 1106, the CPU may write, if a certain sensor in the set of sensors is the inactive sensor, an indication to not provide a clock for the at least one clock source, as described in connection with the examples in FIGS. 1-9. For example, as described in 930 of FIG. 9, CPU 902 may write, if a certain sensor in the set of sensors is the inactive sensor, an indication to not provide a clock for the at least one clock source. Further, step 1106 may be performed by processing unit 120 in FIG. 1.

At 1108, the CPU may select a clock configuration for a set of hardware components at the device based on the detection of whether each of the set of sensors is the active sensor or the inactive sensor, where the clock configuration is associated with the at least one clock source, as described in connection with the examples in FIGS. 1-9. For example, as described in 940 of FIG. 9, CPU 902 may select a clock configuration for a set of hardware components at the device based on the detection of whether each of the set of sensors is the active sensor or the inactive sensor, where the clock configuration is associated with the at least one clock source. Further, step 1108 may be performed by processing unit 120 in FIG. 1. In some aspects, selecting the clock configuration may include selecting the clock configuration based on a certain sensor in the set of sensors being an active sensor. Also, the clock configuration may be a hardware clock control configuration of the at least one clock source. The hardware clock control configuration may be enabled or disabled based on a software configuration for the device. Further, the clock configuration may be a shared clock configuration or a shared voltage configuration for each of the set of hardware components, where the at least one clock source may be a shared clock source or a shared voltage source. The set of hardware components may include at least one of: a camera serial interface physical layer (CSI-PHY), a camera serial interface decoder (CSID), an image signal processor (ISP), or an ISP front engine (IFE).

At 1110, the CPU may receive an indication of a clock for each of the set of hardware components prior to setting the clock control for each of the set of hardware components, where the clock is associated with the at least one clock source, as described in connection with the examples in FIGS. 1-9. For example, as described in 950 of FIG. 9, CPU 902 may receive an indication (e.g., indication 952) of a clock for each of the set of hardware components prior to setting the clock control for each of the set of hardware components, where the clock is associated with the at least one clock source. Further, step 1110 may be performed by processing unit 120 in FIG. 1.

At 1112, the CPU may set a clock control for each of the set of hardware components based on the selected clock configuration, where the clock control is associated with the at least one clock source, as described in connection with the examples in FIGS. 1-9. For example, as described in 960 of FIG. 9, CPU 902 may set a clock control for each of the set of hardware components based on the selected clock configuration, where the clock control is associated with the at least one clock source. Further, step 1112 may be performed by processing unit 120 in FIG. 1. In some aspects, setting the clock control for each of the set of hardware components may include: enabling a logic of the clock for each of the set of hardware components. That is, CPU may enable a logic of the clock for each of the set of hardware components.

At 1114, the CPU may transmit an indication of the at least one clock source for each of the set of hardware components subsequent to setting the clock control for each of the set of hardware components, as described in connection with the examples in FIGS. 1-9. For example, as described in 970 of FIG. 9. CPU 902 may transmit an indication (e.g., indication 972) of the at least one clock source for each of the set of hardware components subsequent to setting the clock control for each of the set of hardware components. Further, step 1114 may be performed by processing unit 120 in FIG. 1.

At 1116, the CPU may output an indication of the selected clock configuration for the set of hardware components at the device, as described in connection with the examples in FIGS. 1-9. For example, as described in 980 of FIG. 9, CPU 902 may output an indication of the selected clock configuration for the set of hardware components at the device. Further, step 1116 may be performed by processing unit 120 in FIG. 1. In some aspects, outputting the indication of the selected clock configuration may include (e.g., comprise): transmitting the indication of the selected clock configuration for the set of hardware components at the device. Also, transmitting the indication of the selected clock configuration may include: transmitting the indication (e.g., indication 982) of the selected clock configuration to a hardware controller. In some aspects, outputting the indication of the selected clock configuration may include: storing the indication of the selected clock configuration for the set of hardware components at the device. Further, storing the indication of the selected clock configuration may include: storing the indication (e.g., indication 984) of the selected clock configuration at a hardware register or a hardware memory.

In configurations, a method or an apparatus for display processing is provided. The apparatus may be a CPU (or other central processor), a DPU (or other display processor), a GPU (or other graphics processor), a DPU driver, a DDIC, an apparatus for display processing, and/or some other processor that may perform display processing. In aspects, the apparatus may be the processing unit 120 within the device 104, or may be some other hardware within the device 104 or another device. The apparatus, e.g., processing unit 120, may include means for obtaining an indication of a set of sensors that are connected to at least one clock source at a device. The apparatus, e.g., processing unit 120, may also include means for detecting whether each of the set of sensors is an active sensor or an inactive sensor. The apparatus, e.g., processing unit 120, may also include means for selecting a clock configuration for a set of hardware components at the device based on the detection of whether each of the set of sensors is the active sensor or the inactive sensor, where the clock configuration is associated with the at least one clock source. The apparatus, e.g., processing unit 120, may also include means for outputting an indication of the selected clock configuration for the set of hardware components at the device. The apparatus, e.g., processing unit 120, may also include means for setting a clock control for each of the set of hardware components based on the selected clock configuration, where the clock control is associated with the at least one clock source. The apparatus, e.g., processing unit 120, may also include means for receiving an indication of a clock for each of the set of hardware components prior to setting the clock control for each of the set of hardware components, where the clock is associated with the at least one clock source. The apparatus, e.g., processing unit 120, may also include means for transmitting an indication of the at least one clock source for each of the set of hardware components subsequent to setting the clock control for each of the set of hardware components. The apparatus, e.g., processing unit 120, may also include means for writing, if a certain sensor in the set of sensors is the inactive sensor, an indication to not provide a clock for the at least one clock source.

The subject matter described herein may be implemented to realize one or more benefits or advantages. For instance, the described data processing techniques may be used by a CPU, a central processor, a DPU driver, a DPU, a display processor, a GPU, or some other processor that may perform data processing to implement the power optimization techniques described herein. This may also be accomplished at a low cost compared to other data processing techniques. Moreover, the data processing techniques herein may improve or speed up data processing or execution. Further, the data processing techniques herein may improve resource or data utilization and/or resource efficiency. Additionally, aspects of the present disclosure may utilize power optimization techniques in order to improve memory bandwidth efficiency and/or increase processing speed at a CPU, a DPU or a GPU.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B. A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

In accordance with this disclosure, the term "or" may be interpreted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that may be accessed by one or more computers or one or more processors to retrieve instructions, code and/or data structures for implementation of the techniques described in this disclosure. By way of example, and not limitation, such computer-readable media may comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs. e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is an apparatus for data processing, including at least one memory; and at least one processor coupled to the at least one memory and, based at least in part on information stored in the at least one memory, the at least one processor, individually or in any combination, is configured to: obtain an indication of a set of sensors that are connected to at least one clock source at a device; detect whether each of the set of sensors is an active sensor or an inactive sensor; select a clock configuration for a set of hardware components at the device based on the detection of whether each of the set of sensors is the active sensor or the inactive sensor, wherein the clock configuration is associated with the at least one clock source; and output an indication of the selected clock configuration for the set of hardware components at the device.

Aspect 2 is the apparatus of aspect 1, wherein the at least one processor, individually or in any combination, is further configured to: set a clock control for each of the set of hardware components based on the selected clock configuration, wherein the clock control is associated with the at least one clock source.

Aspect 3 is the apparatus of aspect 2, wherein the at least one processor, individually or in any combination, is further configured to: receive an indication of a clock for each of the set of hardware components prior to the set of the clock control for each of the set of hardware components, wherein the clock is associated with the at least one clock source; and transmit an indication of the at least one clock source for each of the set of hardware components subsequent to the set of the clock control for each of the set of hardware components.

Aspect 4 is the apparatus of aspect 3, wherein to set the clock control for each of the set of hardware components, the at least one processor, individually or in any combination, is configured to: enable a logic of the clock for each of the set of hardware components.

Aspect 5 is the apparatus of any of aspects 1 to 4, wherein the active sensor is associated with at least one of actively streaming data or leaking voltage, and wherein the inactive sensor is associated with at least one of being powered off or not actively streaming data.

Aspect 6 is the apparatus of any of aspects 1 to 5, wherein to select the clock configuration, the at least one processor, individually or in any combination, is configured to: select the clock configuration based on a certain sensor in the set of sensors being the active sensor.

Aspect 7 is the apparatus of any of aspects 1 to 6, wherein the at least one processor, individually or in any combination, is further configured to: write, if a certain sensor in the set of sensors is the inactive sensor, an indication to not provide a clock for the at least one clock source.

Aspect 8 is the apparatus of any of aspects 1 to 7, wherein the at least one clock source is a shared clock source, a shared voltage source, or a shared clock and voltage source.

Aspect 9 is the apparatus of any of aspects 1 to 8, wherein each of the set of sensors is at least one of: a data transmitter, a camera sensor, a component sensor, or a microphone.

Aspect 10 is the apparatus of aspect 9, wherein the device is a camera, and wherein each of the set of sensors is the camera sensor.

Aspect 11 is the apparatus of any of aspects 1 to 10, wherein the clock configuration is a hardware clock control configuration of the at least one clock source.

Aspect 12 is the apparatus of aspect 11, wherein the hardware clock control configuration is configured to be enabled or disabled based on a software configuration for the device.

Aspect 13 is the apparatus of any of aspects 1 to 12, wherein the set of hardware components includes at least one of: a camera serial interface physical layer (CSI-PHY), a camera serial interface decoder (CSID), an image signal processor (ISP), or an ISP front engine (IFE).

Aspect 14 is the apparatus of any of aspects 1 to 13, wherein the clock configuration is a shared clock configuration or a shared voltage configuration for each of the set of hardware components, wherein the at least one clock source is a shared clock source or a shared voltage source.

Aspect 15 is the apparatus of any of aspects 1 to 14, wherein to output the indication of the selected clock configuration, the at least one processor, individually or in any combination, is configured to: transmit the indication of the selected clock configuration for the set of hardware components at the device.

Aspect 16 is the apparatus of aspect 15, further comprising at least one of an antenna or a transceiver coupled to the at least one processor, wherein to transmit the indication of the selected clock configuration, the at least one processor, individually or in any combination, is further configured to: transmit, via at least one of the antenna or the transceiver, the indication of the selected clock configuration to a hardware controller.

Aspect 17 is the apparatus of any of aspects 1 to 16, wherein to output the indication of the selected clock configuration, the at least one processor, individually or in any combination, is further configured to: store the indication of the selected clock configuration for the set of hardware components at the device.

Aspect 18 is the apparatus of aspect 17, wherein to store the indication of the selected clock configuration, the at least one processor, individually or in any combination, is configured to: store the indication of the selected clock configuration at a hardware register or a hardware memory.

Aspect 19 is a method of data processing for implementing any of aspects 1 to 18.

Aspect 20 is an apparatus for data processing including means for implementing any of aspects 1 to 18.

Aspect 21 is a computer-readable medium (e.g., a non-transitory computer-readable medium) storing computer executable code, the code when executed by at least one processor causes the at least one processor to implement any of aspects 1 to 18.

What is claimed is:

1. An apparatus for data processing, comprising:
    at least one memory; and
    at least one processor coupled to the at least one memory and, based at least in part on information stored in the at least one memory, the at least one processor is configured to:
        obtain an indication of a set of sensors that are connected to at least one clock source at a device;
        detect whether each of the set of sensors is active or inactive;
        select a clock configuration for a set of hardware components at the device based on the detection of whether each of the set of sensors is active or inactive, wherein the clock configuration is associated with the at least one clock source;
        set a clock control for each of the set of hardware components based on the selected clock configuration, wherein the clock control is associated with the at least one clock source, wherein the setting of the clock control for each of the set of hardware components corresponds to an enablement of a number of bits for an amount of active sensors in the set of sensors; and
        output an indication of the selected clock configuration for the set of hardware components at the device.

2. The apparatus of claim 1, wherein the at least one processor is further configured to:
    receive an indication of a clock for each of the set of hardware components prior to the set of the clock control for each of the set of hardware components, wherein the clock is associated with the at least one clock source; and
    transmit an indication of the at least one clock source for each of the set of hardware components subsequent to the set of the clock control for each of the set of hardware components.

3. The apparatus of claim 2, wherein to set the clock control for each of the set of hardware components, the at least one processor is configured to: enable a logic of the clock for each of the set of hardware components.

4. The apparatus of claim 1, wherein the active sensor is associated with at least one of actively streaming data or leaking voltage, and wherein the inactive sensor is associated with at least one of being powered off or not actively streaming data.

5. The apparatus of claim 1, wherein to select the clock configuration, the at least one processor is configured to: select the clock configuration based on a certain sensor in the set of sensors being active.

6. The apparatus of claim 1, wherein the at least one processor is further configured to:
    write, if a certain sensor in the set of sensors is inactive, an indication to not provide a clock for the at least one clock source.

7. The apparatus of claim 1, wherein the at least one clock source is a shared clock source, a shared voltage source, or a shared clock and voltage source.

8. The apparatus of claim 1, wherein each of the set of sensors is at least one of: a data transmitter, a camera sensor, a component sensor, or a microphone.

9. The apparatus of claim 8, wherein the device is a camera, and wherein each of the set of sensors is the camera sensor.

10. The apparatus of claim 1, wherein the clock configuration is a hardware clock control configuration of the at least one clock source.

11. The apparatus of claim 10, wherein the hardware clock control configuration is configured to be enabled or disabled based on a software configuration for the device.

12. The apparatus of claim 1, wherein the set of hardware components includes at least one of: a camera serial interface physical layer (CSI-PHY), a camera serial interface decoder (CSID), an image signal processor (ISP), or an ISP front engine (IFE).

13. The apparatus of claim 1, wherein the clock configuration is a shared clock configuration or a shared voltage configuration for each of the set of hardware components, wherein the at least one clock source is a shared clock source or a shared voltage source.

14. The apparatus of claim 1, wherein to output the indication of the selected clock configuration, the at least one processor is configured to: transmit the indication of the selected clock configuration for the set of hardware components at the device.

15. The apparatus of claim 14, further comprising at least one of an antenna or a transceiver coupled to the at least one processor, wherein to transmit the indication of the selected clock configuration, the at least one processor is configured to: transmit, via at least one of the antenna or the transceiver, the indication of the selected clock configuration to a hardware controller.

16. The apparatus of claim 1, wherein to output the indication of the selected clock configuration, the at least one processor is configured to: store the indication of the selected clock configuration for the set of hardware components at the device.

17. The apparatus of claim 16, wherein to store the indication of the selected clock configuration, the at least one processor is configured to: store the indication of the selected clock configuration at a hardware register or a hardware memory.

18. A method of data processing, comprising:
obtaining an indication of a set of sensors that are connected to at least one clock source at a device;
detecting whether each of the set of sensors is active or inactive;
selecting a clock configuration for a set of hardware components at the device based on the detection of whether each of the set of sensors is active or inactive wherein the clock configuration is associated with the at least one clock source;
setting a clock control for each of the set of hardware components based on the selected clock configuration, wherein the clock control is associated with the at least one clock source, wherein the setting of the clock control for each of the set of hardware components corresponds to an enablement of a number of bits for an amount of active sensors in the set of sensors; and
outputting an indication of the selected clock configuration for the set of hardware components at the device.

19. The method of claim 18, further comprising:
receiving an indication of a clock for each of the set of hardware components prior to setting the clock control for each of the set of hardware components, wherein the clock is associated with the at least one clock source; and
transmitting an indication of the at least one clock source for each of the set of hardware components subsequent to setting the clock control for each of the set of hardware components, wherein setting the clock control for each of the set of hardware components comprises: enabling a logic of the clock for each of the set of hardware components.

20. The method of claim 18, wherein an active sensor is associated with at least one of actively streaming data or leaking voltage, and wherein an inactive sensor is associated with at least one of being powered off or not actively streaming data; and
wherein selecting the clock configuration comprises: selecting the clock configuration based on a certain sensor in the set of sensors being active.

21. The method of claim 18, further comprising:
writing, if a certain sensor in the set of sensors is inactive, an indication to not provide a clock for the at least one clock source.

22. The method of claim 18, wherein the at least one clock source is a shared clock source, a shared voltage source, or a shared clock and voltage source; and
wherein each of the set of sensors is at least one of: a data transmitter, a camera sensor, a component sensor, or a microphone, and wherein the device is a camera, and wherein each of the set of sensors is the camera sensor.

23. The method of claim 18, wherein the clock configuration is a hardware clock control configuration of the at least one clock source, and wherein the hardware clock control configuration is enabled or disabled based on a software configuration for the device.

24. The method of claim 18, wherein the set of hardware components includes at least one of: a camera serial interface physical layer (CSI-PHY), a camera serial interface decoder (CSID), an image signal processor (ISP), or an ISP front engine (IFE); and
wherein the clock configuration is a shared clock configuration or a shared voltage configuration for each of the set of hardware components, wherein the at least one clock source is a shared clock source or a shared voltage source.

25. The method of claim 18, wherein outputting the indication of the selected clock configuration comprises: transmitting the indication of the selected clock configuration for the set of hardware components at the device, and wherein transmitting the indication of the selected clock configuration comprises: transmitting the indication of the selected clock configuration to a hardware controller.

26. The method of claim 18, wherein outputting the indication of the selected clock configuration comprises: storing the indication of the selected clock configuration for the set of hardware components at the device, and wherein storing the indication of the selected clock configuration comprises: storing the indication of the selected clock configuration at a hardware register or a hardware memory.

27. An apparatus for data processing, comprising:
means for obtaining an indication of a set of sensors that are connected to at least one clock source at a device;
means for detecting whether each of the set of sensors is active or inactive;
means for selecting a clock configuration for a set of hardware components at the device based on the detection of whether each of the set of sensors is active or inactive, wherein the clock configuration is associated with the at least one clock source;
means for setting a clock control for each of the set of hardware components based on the selected clock configuration, wherein the clock control is associated with the at least one clock source, wherein the setting of the clock control for each of the set of hardware components corresponds to an enablement of a number of bits for an amount of active sensors in the set of sensors; and
means for outputting an indication of the selected clock configuration for the set of hardware components at the device.

28. A non-transitory computer-readable medium storing computer executable code for data processing, the code when executed by at least one processor causes the at least one processor to:
obtain an indication of a set of sensors that are connected to at least one clock source at a device;
detect whether each of the set of sensors is active or inactive;
select a clock configuration for a set of hardware components at the device based on the detection of whether each of the set of sensors is active or inactive, wherein the clock configuration is associated with the at least one clock source;
set a clock control for each of the set of hardware components based on the selected clock configuration, wherein the clock control is associated with the at least one clock source, wherein the setting of the clock control for each of the set of hardware components corresponds to an enablement of a number of bits for an amount of active sensors in the set of sensors; and
output an indication of the selected clock configuration for the set of hardware components at the device.

* * * * *